US008511364B2

(12) United States Patent
Anderson et al.

(10) Patent No.: US 8,511,364 B2
(45) Date of Patent: Aug. 20, 2013

(54) SPRING MOTOR FOR DRIVE FOR COVERINGS FOR ARCHITECTURAL OPENINGS

(75) Inventors: Richard N. Anderson, Whitesville, KY (US); Robert E. Fisher, II, Owensboro, KY (US); Donald E. Fraser, Owensboro, KY (US); Stephen R. Haarer, Whitesville, KY (US)

(73) Assignee: Hunter Douglas Inc., Pearl River, NY (US)

( * ) Notice: Subject to any disclaimer, the term of this patent is extended or adjusted under 35 U.S.C. 154(b) by 866 days.

(21) Appl. No.: 12/427,132

(22) Filed: Apr. 21, 2009

(65) Prior Publication Data

US 2009/0242332 A1 Oct. 1, 2009

Related U.S. Application Data

(63) Continuation-in-part of application No. 11/876,360, filed on Oct. 22, 2007, now Pat. No. 7,740,045, and application No. 12/427,132, which is a continuation-in-part of application No. 11/332,692, filed on Jan. 13, 2006, now Pat. No. 7,886,803.

(60) Provisional application No. 60/909,077, filed on Mar. 30, 2007, provisional application No. 60/862,855, filed on Oct. 25, 2006.

(51) Int. Cl.

| | |
|---|---|
| ***A47H 5/00*** | (2006.01) |
| ***E06B 3/48*** | (2006.01) |
| ***E06B 3/94*** | (2006.01) |
| ***E06B 9/06*** | (2006.01) |
| ***F03G 1/00*** | (2006.01) |

(52) U.S. Cl.
USPC .......................................... 160/84.05; 185/37

(58) Field of Classification Search
USPC ..................... 160/168.1 R, 168.1 P, 301, 302, 160/303, 304, 305, 306, 307, 308, 313; 185/37; 188/74, 78
See application file for complete search history.

(56) References Cited

U.S. PATENT DOCUMENTS

| | | | |
|---|---|---|---|
| 15,615 | A | 8/1856 | Miles |
| 59,009 | A | 10/1866 | Handforth |
| 201,109 | A | 3/1878 | Griffith |
| 337,043 | A | 3/1886 | Baker |
| 2,410,549 | A | 11/1946 | Olson |
| 2,520,629 | A | 8/1950 | Esposito |
| 2,758,644 | A | 8/1956 | Virlouvet |
| 2,833,534 | A | 5/1958 | Foster |
| 2,973,660 | A | 3/1961 | Popper |
| 3,450,365 | A | 6/1969 | Kaplan |
| 4,372,432 | A | 2/1983 | Waine et al. |

(Continued)

FOREIGN PATENT DOCUMENTS

WO WO2008025494 3/2008

OTHER PUBLICATIONS

Comfortex Chordless Unit, photographs of units on sale as of 1997.

*Primary Examiner* — Katherine Mitchell
*Assistant Examiner* — Jeremy Ramsey
(74) *Attorney, Agent, or Firm* — Camoriano & Associates; Theresa Camoriano

(57) ABSTRACT

A spring motor and drag brake for use in coverings for architectural openings.

17 Claims, 39 Drawing Sheets

(56) References Cited

U.S. PATENT DOCUMENTS

| | | | | |
|---|---|---|---|---|
| 4,869,357 | A | 9/1989 | Batchelder | |
| 5,167,269 | A | 12/1992 | Abo | |
| 5,184,660 | A | 2/1993 | Jelic | |
| 5,628,356 | A | 5/1997 | Marocco | |
| 5,799,715 | A | 9/1998 | Biro et al. | |
| 6,056,036 | A * | 5/2000 | Todd et al. | 160/84.05 |
| 6,129,131 | A | 10/2000 | Colson | |
| 6,142,211 | A | 11/2000 | Judkins | |
| 6,158,563 | A | 12/2000 | Welfonder et al. | |
| 6,173,825 | B1 | 1/2001 | Liu | |
| 6,283,192 | B1 * | 9/2001 | Toti | 160/170 |
| 6,508,293 | B1 | 1/2003 | Huang | |
| 6,536,503 | B1 | 3/2003 | Anderson et al. | |
| 6,561,252 | B2 | 5/2003 | Anderson et al. | |
| 6,571,853 | B1 | 6/2003 | Ciuca | |
| 6,575,223 | B1 | 6/2003 | Chung et al. | |
| 6,588,480 | B2 | 7/2003 | Anderson | |
| 6,644,375 | B2 | 11/2003 | Palmer | |
| 6,655,441 | B2 | 12/2003 | Wen et al. | |
| 6,662,850 | B2 * | 12/2003 | Chung et al. | 160/171 |
| 6,675,861 | B2 | 1/2004 | Palmer et al. | |
| 6,685,592 | B2 | 2/2004 | Fraczek et al. | |
| 6,736,185 | B2 | 5/2004 | Smith et al. | |
| 6,739,373 | B1 | 5/2004 | Liu et al. | |
| 6,843,302 | B2 | 1/2005 | Nijs | |
| 6,901,988 | B2 | 6/2005 | Colson et al. | |
| 6,915,831 | B2 | 7/2005 | Anderson | |
| 7,021,360 | B2 | 4/2006 | Schroeder et al. | |
| 7,025,107 | B2 | 4/2006 | Ciuca | |
| 7,287,570 | B2 * | 10/2007 | Strand | 160/171 |
| 2002/0050539 | A1 | 5/2002 | Anderson | |
| 2002/0174961 | A1 * | 11/2002 | Anderson et al. | 160/178.1 R |
| 2003/0015300 | A1 | 1/2003 | Colson et al. | |
| 2005/0109471 | A1 | 5/2005 | Strand | |
| 2006/0118248 | A1 | 6/2006 | Anderson et al. | |
| 2008/0099281 | A1 | 5/2008 | Anderson et al. | |
| 2009/0020239 | A1 | 1/2009 | Yu et al. | |

* cited by examiner

SPRING MOTOR FOR DRIVE FOR COVERINGS FOR ARCHITECTURAL OPENINGS

This application is a continuation-in-part of U.S. application Ser. No. 11/876,360 filed Oct. 22, 2007, now U.S. Pat. No. 7,740,045 which claims priority from US. Provisional Application Ser. No. 60/909,077, filed Mar. 30, 2007, and from U.S. Provisional Application Ser. No. 60/862,855, filed Oct. 25, 2006. This application is also a continuation-in-part of U.S. application Ser. No. 11/332,692, filed Jan. 13, 2006 now U.S. Pat. No. 7,886,803.

BACKGROUND

The present invention relates to a spring motor and transmission combination which can be used for raising and lowering or for tilting coverings for architectural openings such as Venetian blinds, pleated shades, vertical blinds, other expandable materials, and other mechanical devices.

Typically, a blind transport system will have a head rail which both supports the covering and hides the mechanisms used to raise and lower or open and close the covering. Such a blind system is described in U.S. Pat. No. 6,536,503, Modular Transport System for Coverings for Architectural Openings, which is hereby incorporated herein by reference. In the typical top/down product, the raising and lowering of the covering is done by a lift cord or lift cords suspended from the head rail and attached to the bottom rail (also referred to as the moving rail or bottom slat). The opening and closing of the covering is typically accomplished with ladder tapes (and/or tilt cables) which run along the front and back of the stack of slats. The lift cords usually run along the front and back of the stack of slats or through holes in the slats. In these types of coverings, the force required to raise the covering is at a minimum when it is fully lowered (fully extended), since the weight of the slats is supported by the ladder tape so that only the bottom rail is being raised at the onset. As the covering is raised further, the slats stack up onto the bottom rail, transferring the weight of the slats from the ladder tape to the lift cords, so progressively greater lifting force is required to raise the covering as it approaches the fully raised (fully retracted) position.

Some window covering products are built in the reverse (bottom up), where the moving rail, instead of being at the bottom of the window covering bundle, is at the top of the window covering bundle, between the bundle and the head rail, such that the bundle is normally accumulated at the bottom of the window when the covering is retracted and the moving rail is at the top of the window covering, next to the head rail, when the covering is extended. There are also composite products which are able to do both, to go top down and/or bottom up.

In horizontal window covering products, there is an external force of gravity against which the operator is acting to move the expandable material from one of its expanded and retracted positions to the other.

In contrast to a blind, in a top down shade, such as a shear horizontal window shade, the entire light blocking material typically wraps around a rotator rail as the shade is raised. Therefore, the weight of the shade is transferred to the rotator rail as the shade is raised, and the force required to raise the shade is thus progressively lower as the shade (the light blocking element) approaches the fully raised (fully open) position. Of course, there are also bottom up shades and composite shades which are able to do both, to go top down and/or bottom up. In the case of a bottom/up shade, the weight of the shade is transferred to the rotator rail as the shade is lowered, mimicking the weight operating pattern of a top/down blind.

In the case of vertically-oriented window coverings, which move from side to side rather than up and down, a first cord is usually used to pull the covering to the retracted position and then a second cord (or second end of the first cord in the case of a cord loop) is used to pull the covering to the extended position. In this case, the operator is not acting against gravity. However, these window coverings may also be arranged to have another outside force or load other than gravity, such as a spring, against which the operator would act to move the expandable material from one position to another.

A wide variety of drive mechanisms is known for extending and retracting coverings—moving the coverings vertically or horizontally or tilting slats. A number of these drive mechanisms may use a spring motor to provide the catalyst force (and/or to supplement the operator supplied catalyst force) to move the coverings.

DESCRIPTION

FIGS. 1 through 32 and FIG. 35 illustrate various embodiments of spring motors. These spring motors can be used for extending and retracting window coverings by raising and lowering them, moving them from side to side, or tilting their slats open and closed. Window coverings or coverings for architectural openings may also be referred to herein more specifically as blinds or shades.

Figure 1:
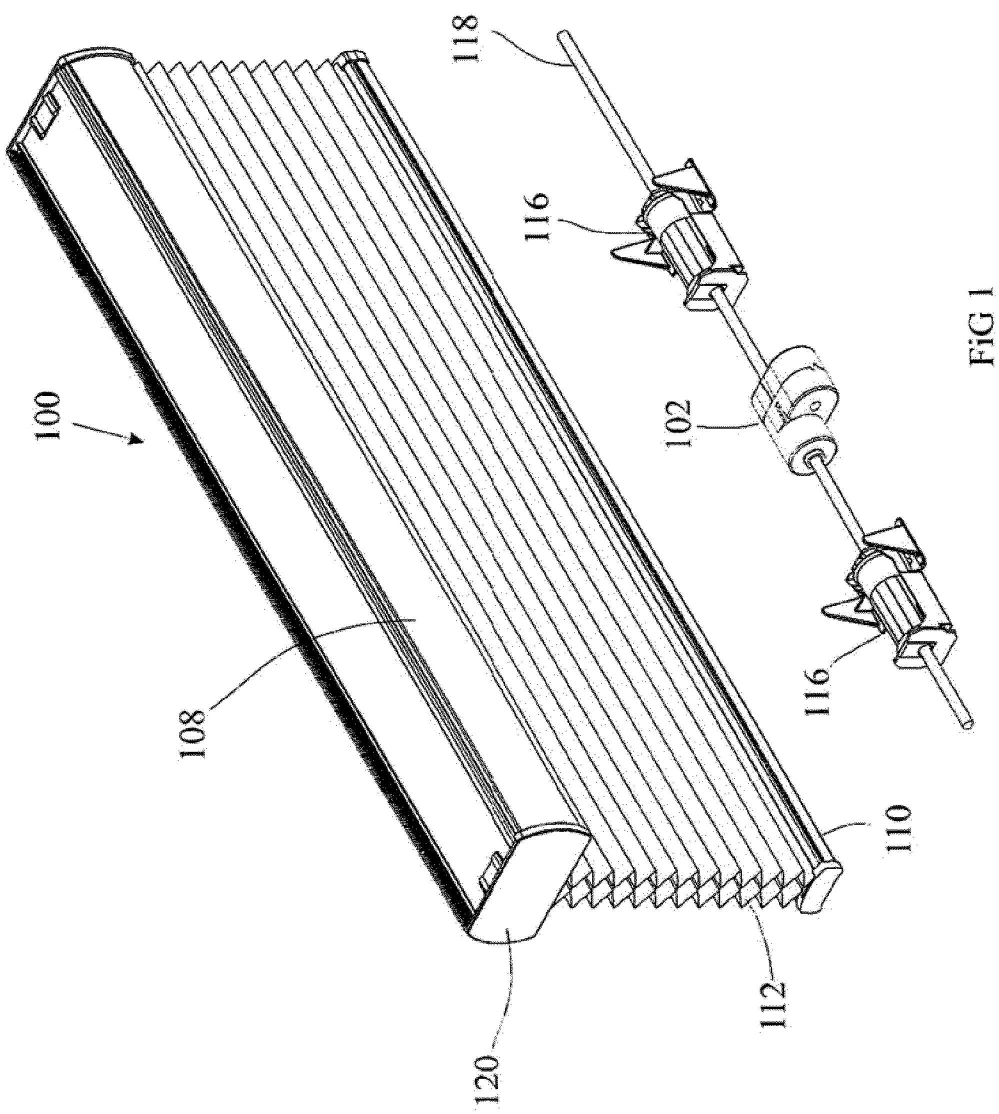
FIG. 1 is a partially exploded perspective view of a window shade and the drive for this window shade incorporating a spring motor.
Figure 3:
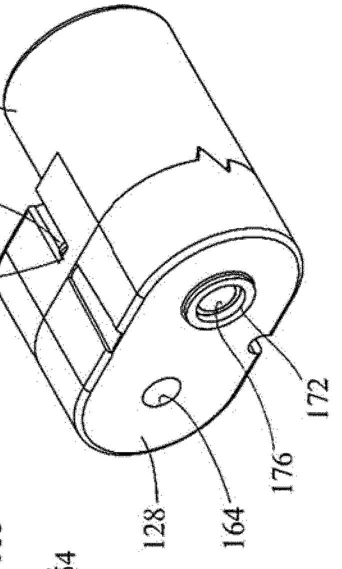
FIG. 3 is a perspective view of the assembled motor of FIG. 2.

FIG. 1 is a partially exploded, perspective view of a first embodiment of a cellular shade 100 utilizing a spring motor and drag brake combination 102.

Figure 6A:
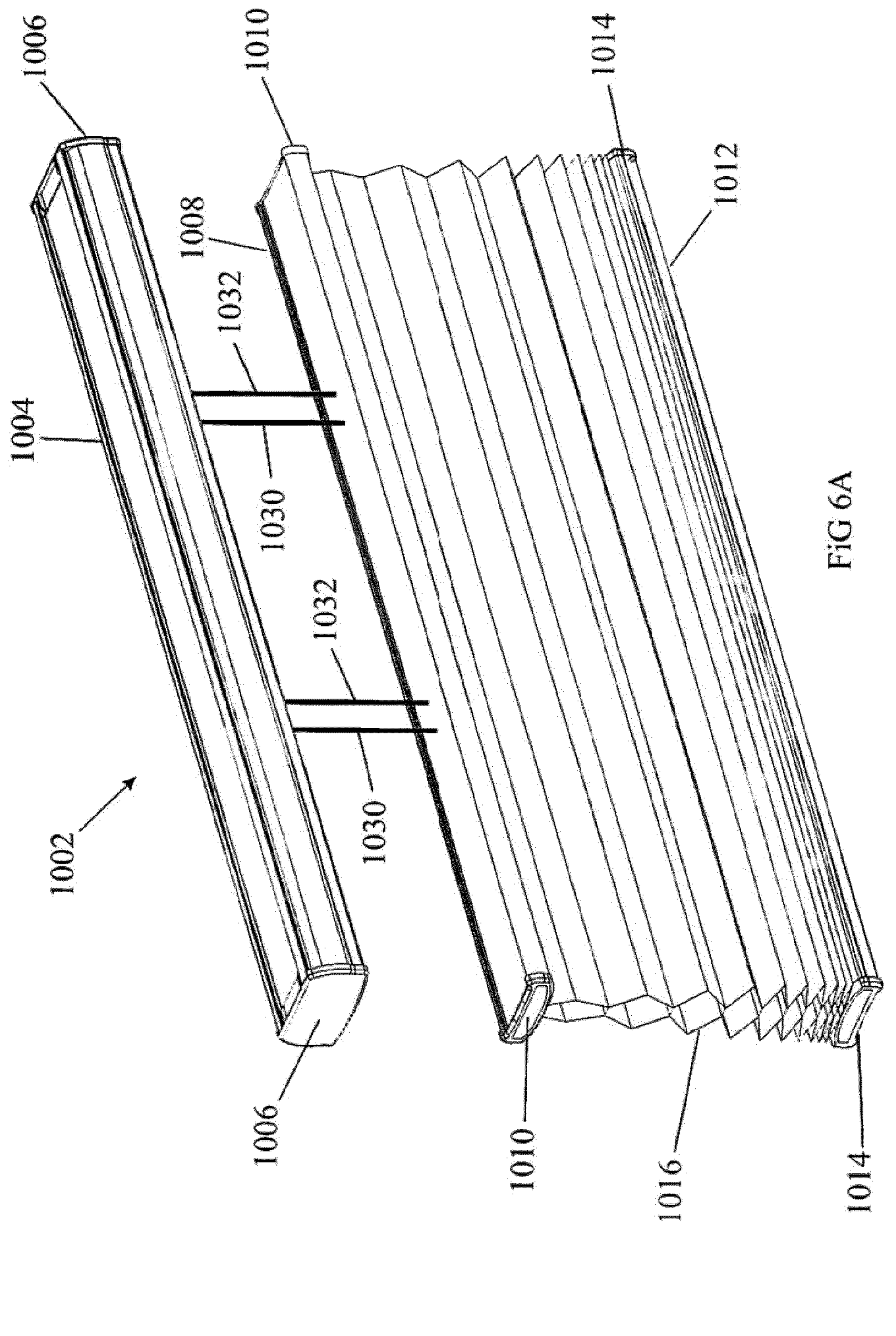
FIG. 6A is a perspective view of a top down/bottom up shade incorporating the spring motors of FIG. 3.

The shade 100 of FIG. 1 includes a head rail 108, a bottom rail 110, and a cellular shade structure 112 suspended from the head rail 108 and attached to both the head rail 108 and the bottom rail 110. The covering material 112 has a width that is essentially the same as the length of the head rail 108 and of the lift rod 118, and it has a height when fully extended that is essentially the same as the length of the lift cords (not shown in this view but two sets are shown in FIG. 6A), which are attached to the bottom rail 110 and to lift stations 116 such that when the lift rod 118 rotates, the lift spools on the lift stations 116 also rotate, and the lift cords wrap onto or unwrap from the lift stations 116 to raise or lower the bottom rail 110 and thus raise or lower the shade 100. These lift stations 116 and their operating principles are disclosed in U.S. Pat. No. 6,536,503 “Modular Transport System for Coverings for Architectural Openings”, issued Mar. 25, 2003, which is hereby incorporated herein by reference. End caps 120 close the ends of the head rail 108 and may be used to mount the cellular product 100 to the architectural opening.

Disposed between the two lift stations 116 is a spring motor and drag brake combination 102 which is functionally interconnected to the lift stations 116 via the lift rod 118 such that, when the spring motor rotates, the lift rod 118 and the spools on the lift stations 116 also rotate, and vice versa, as discussed in more detail below. The use of spring motors to raise and lower window blinds was also disclosed in the aforementioned U.S. Pat. No. 6,536,503 “Modular Transport System for Coverings for Architectural Openings”.

In order to raise the shade, the user lifts up on the bottom rail 110. The spring motor assists the user in raising the shade. At the same time, the drag brake portion of the spring motor and drag brake combination 102 exerts a resistance to this upward motion of the shade. As explained below, the drag brake exerts two different torques to resist rotation, depending upon the direction of rotation. In this embodiment, the resistance to the upward motion that is exerted by the drag brake is the lesser of the two torques (referred to as the release torque), as explained in more detail below. This release torque, together with system friction and the torque due to the weight of the shade, is large enough to prevent the spring motor from causing the shade 100 to creep up once the shade has been released by the user.

To lower the shade, the user pulls down on the bottom rail 110, with the force of gravity assisting the user in this task. While pulling down on the bottom rail 100, the spring motor is rotated so as to increase the potential energy of the flat spring (by winding the flat spring of the motor onto its output spool 122, as explained in more detail below). The drag brake portion of the combination 102 exerts a resistance to this downward motion of the shade, and this resistance is the larger of the two torques (referred to as the holding torque) exerted by the drag brake, as explained in more detail below. This holding torque, combined with the torque exerted by the spring motor and system friction, is large enough to prevent the shade 100 from falling down. Thus, the shade remains in the position where it is released by the operator regardless of where the shade is released along its full range of travel; it neither creeps upwardly nor falls downwardly when released.

Figure 2:
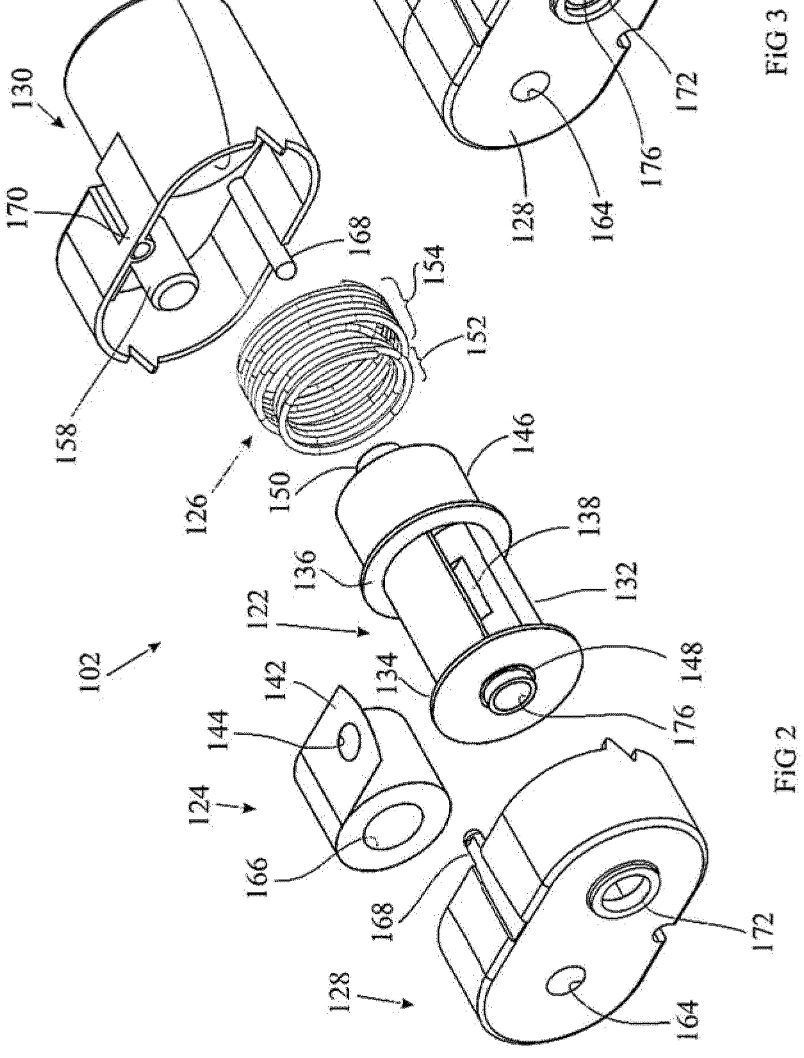
FIG. 2 is an exploded perspective view of the spring motor of FIG. 1.

Referring now to FIG. 2, the spring motor and drag brake combination 102 includes a motor output spool 122, a flat spring 124 (also referred to as a motor spring 124), a stepped coil spring 126, a motor housing portion 128, and a brake housing portion 130. The two housing portions 128, 130 connect together to form a complete housing. It should be noted that, in this embodiment, the brake housing portion 130 extends beyond the brake mechanism to enclose part of the motor as well.

The motor output spool 122 (See also FIG. 5) includes a spring take-up portion 132, which is flanked by beveled left and right shoulders 134, 136, respectively, and defines an axially oriented flat recess 138 including a raised button 140 (See FIG. 5) for securing a first end 142 of the flat spring 124 to the motor output spool 122. The first end 142 of the flat spring 124 is threaded into the flat recess 138 of the spring take-up portion 132 until the raised button 140 of the spring take-up portion 132 snaps through the opening 144 at the first end 142 of the flat spring 124, releasably securing the flat spring 124 to the motor output spool 122.

The motor output spool 122 further includes a drag brake drum portion 146 extending axially to the right of the right shoulder 136. Stub shafts 148, 150 extend axially from each end of the motor output spool 122 for rotational support of the motor output spool 122 as described later.

The flat spring 124 is a flat strip of metal which has been wound tightly upon itself as depicted in FIG. 2. As discussed above, a first end 142 of the spring 124 defines a through opening 144 for releasably securing the flat spring 124 to the motor output spool 122. The routing of the flat spring 124, as seen from the vantage point of FIG. 2, is for the end 142 of the flat spring 124 to go under the motor output spool 122 and into the flat 138 until the button 140 snaps into the through opening 144 of the flat spring 124.

Referring now to the coil spring 126, it resembles a traditional coil spring except that it defines two different coil diameters. (It should be noted that the coil diameter is just one characteristic of the coil. Another characteristic is its wire diameter or wire cross-sectional dimension.) The first coil portion 152 has a smaller coil diameter and defines an inner diameter which is just slightly smaller than the outside diameter of the drag brake drum 146. The second coil portion 154 has a larger coil diameter and defines an outer diameter which is just slightly larger than the inside diameter of the corresponding cavity 156 (also referred to as the housing bore 156 or drag brake bore 156) defined by the brake housing 130, as described in more detail below.

The brake housing portion 130 defines a cylindrical cavity 156 (which, as indicated earlier is also referred to as the drag brake housing bore 156) which is just slightly smaller in diameter than the outer diameter of the second coil portion 154 of the stepped coil spring 126. The brake housing portion 130 includes an internal hollow shaft projection 158, which, together with a similar and matching internal hollow shaft projection 160 (See FIG. 5) in the motor housing portion 128 defines a flat spring storage spool 162 which defines a through opening 164 extending through the housing portions 128, 130. As explained later, this through opening 164 may be used as a pass-through location for a rod (such as a lift rod or a tilt rod), allowing the placement of two independent drives in very close parallel proximity to each other, resulting in the possibility of using a narrower head rail 108 than might otherwise be possible.

Figure 5:
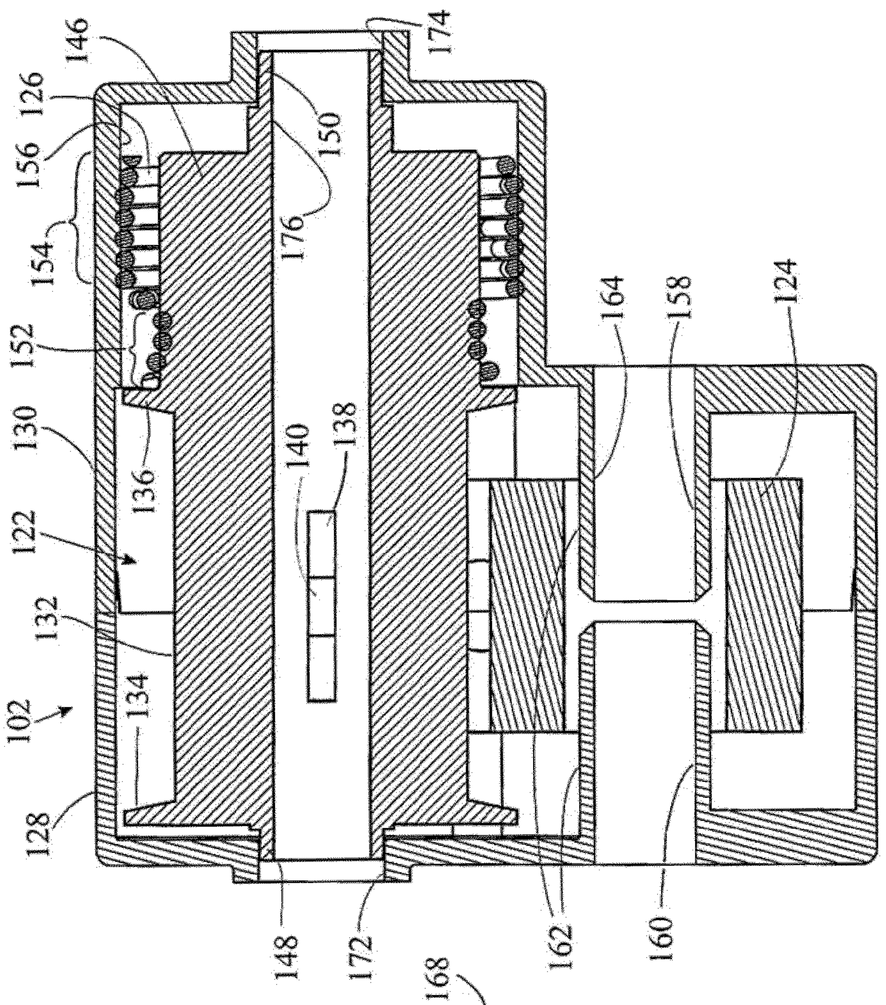
FIG. 5 is a section view along line 5-5 of FIG. 4.

In FIG. 5, the first coil portion 152 of the stepped coil spring 126 is shown as being practically embedded in the drag brake drum portion 146, and the second coil portion 154 is similarly shown as being practically embedded in the drag brake bore 156. In fact, these coil portions 152, 154 are not actually embedded into their respective parts 146, 156, but are shown in this manner to represent the fact that there is an interference fit between the coil portions 152, 154 and their respective drum 146 and housing bore 156. It is the amount of this interference fit as well as the wire diameter or the wire cross-sectional dimension of the stepped coil spring 126 which dictates the release torque and the holding torque which must be overcome in order to cause the brake drum 146 to rotate relative to the housing 130 in a first direction and a second direction, respectively. These two torques may also be referred to as component torques, since they are the torques exerted by or on the drag brake component, as opposed to system torque, which is the torque exhibited by the system as a whole and which may also include torques due to the spring motor portion of the combination 102, friction torques, torque due to the weight of the shade, and so forth.

The coil spring 126 exerts torques against both the brake drum 146 and the bore 156 of the housing 130, and these torques resist rotation of the brake drum 146 relative to the housing 130 in both the clockwise and counterclockwise directions. The amount of torque exerted by the coil spring 126 against the brake drum 146 and the bore 156 varies depending upon the direction of rotation of the brake drum 146 relative to the housing 130, and the place where slippage occurs changes depending upon the direction of rotation. In order to facilitate this description, the coil spring torque that must be overcome in order to rotate the brake drum in one direction relative to the housing will be referred to as the holding torque, and the coil spring torque that must be overcome in order to rotate the brake drum in the other direction relative to the housing will be referred to as the release torque.

The holding torque occurs when the output spool and brake drum rotate in a counterclockwise direction relative to the housing 130 (as seen from the vantage point of FIG. 2) which tends to open up or expand the coil spring 126 away from the drum portion 146 and toward the bore 156 of the housing 130. In this situation, the drag brake drum portion 146 slips past the first coil portion 152 of the coil spring 126, while the second coil portion 154 of the coil spring 126 locks onto the housing bore 156. This holding torque is the higher of the two component torques of this drag brake component, and, in this embodiment, occurs when the flat spring 124 is winding onto the output spool 122 (and unwinding from the storage spool 162, increasing the potential energy of the device 102), which also is when the shade 100 is being pulled down by the user with the assistance of gravitational force.

Thus, when the user pulls down on the bottom rail 110 to overcome the holding torque, the flat spring 124 winds onto the output spool, and the drum 146 slips relative to the coil spring 126. The holding torque is designed to be sufficient to prevent the shade 100 from falling downwardly when the user releases it at any point along the travel distance of the shade 112. (Of course, this arrangement could be reversed, so that the counterclockwise rotation occurs when the user lifts on the bottom rail.)

Similarly, when the bottom rail 110 of the shade 100 is lifted up, the output spool 122 and brake drum 146 rotate in a clockwise direction relative to the bore 156 of the housing 130 (as seen from FIG. 2). The flat spring 124 winds onto the storage spool 162 and unwinds from the output spool 132, aiding the user in the raising of the shade 100. Also, the stepped coil spring 126 rotates in the same clockwise direction, causing the coil spring 126 to contract away from the housing bore 156 and toward the drum 146. This causes the first coil portion 152 to clamp down on the drag brake drum portion 146 and the second coil portion 154 to shrink away from the bore 156. The release torque (the lower of the two torques for this drag brake component) occurs when the stepped coil spring 126 slips relative to the housing bore 156.

Thus, when the operator lifts up on the bottom rail 110, the flat spring 124 winds up onto the storage spool 162 and the coil spring slips relative to the bore 156 as the shade rises.

To summarize, the holding torque is the larger of the two torques for this drag brake component, and it occurs when the coil spring 126 grows or expands such that the second coil portion 154 expands against and "locks" onto the bore 156 of the housing 130, and the first coil portion 152 expands from, and slips relative to, the drag brake drum portion 146. The release torque is the smaller of the two torques for the drag brake component, and it occurs when the drag-brake spring 126 collapses such that the second coil portion 154 contracts away from and slips relative to the bore 156 of the housing 130, and the first coil portion 152 collapses and "locks" onto the drag brake drum portion 146. Both torques for the drag brake component provide a resistance to rotation of the drum 146 and of the output spool 122 relative to the housing 130. The amount of torque for each direction of rotation of the drag brake and which of the torques will be larger depends upon the particular application.

To assemble the spring motor and drag brake combination 102, the flat spring 124 is secured to the output spool 122 as has already been described. The stepped coil spring 126 is slid over the drag brake drum portion 146 of the output spool 122, and this assembly is placed inside the brake housing portion 130 with the central opening 166 of the flat spring 124 sliding over the hollow shaft projection 158 of the brake housing portion 130 and the stepped coil spring 126 disposed inside the drag brake bore 156. The motor housing portion 128 then is mated to the brake housing portion 130. The two housing portions 128, 130 snap together with the pegs 168 and bridges 170 shown (which are fully described in the U.S. patent application Ser. No. 11/382,089 "Snap-Together Design for Component Assembly", filed on May 8, 2006, which is hereby incorporated herein by reference). The stub shafts 148, 150 of the output spool 122 ride on corresponding through openings 172, 174 (See FIG. 5) in the motor housing portion 128 and the drag brake drum portion 146, respectively, for rotatably supporting the output spool 122.

As seen in FIG. 5, the flat spring 124 is shown in the "fully discharged" position, all wound onto the storage spool 162. The stepped coil spring 126 is shown in an intermediate position wherein the first coil portion 152 is tightly wound around the drag brake drum portion 146, and the second coil portion 154 is also tightly wound against the drag brake bore 156. As explained earlier, as the bottom rail 110 of the shade 100 is pulled downwardly by the user, the stepped coil spring 126 expands or opens up such that the second coil portion 154 locks tightly onto the drag brake bore 156, while the first coil portion 152 expands away from the drag brake drum portion 146, which allows the brake to slip at the brake drum portion 146, at the higher of the two torques for the drag brake component, which is referred to as the holding torque. The user must overcome this holding torque as well as the torque required to wind the flat spring 24 onto the output spool 122 and any other system torques in order to lower the shade 100, and these are also the torques which prevent the shade from falling downwardly once the user releases the shade 100.

FIG. 1 shows how the spring motor and drag brake combination 102 may be installed in a shade 100. Since the lift rod 118 goes completely through the spring motor and drag brake combination 102 (via the axially-aligned through opening 176 in the output spool 122), the spring motor and drag brake combination 102 may be installed anywhere along the length of the head rail 108, either between the lift stations 116 or on either side of the lift stations 116. This design gives much more mounting flexibility than that afforded by prior art designs.

Figure 4:
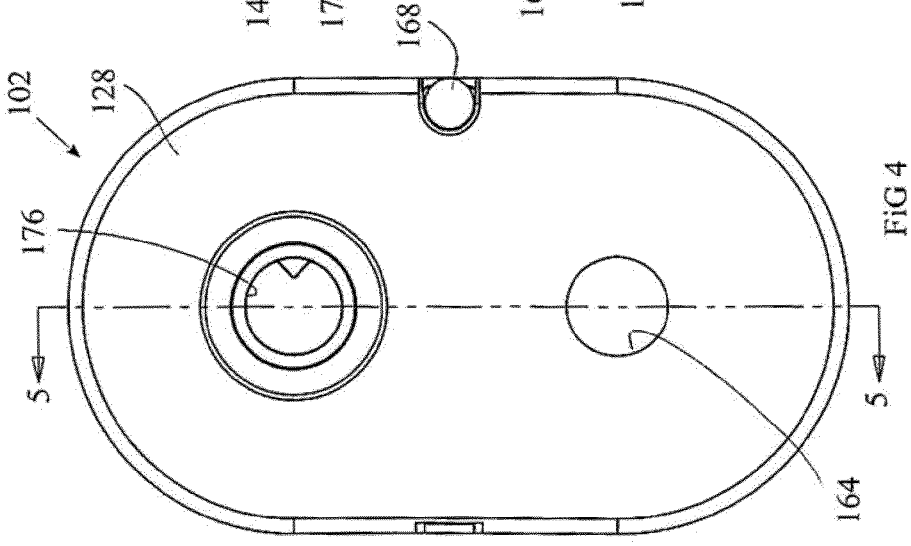
FIG. 4 is an end view of the spring motor of FIG. 3.

Note in FIG. 4 that this through opening 176 in the output spool 122 has a non-circular profile. In fact, in this particular embodiment, it has a "V" notch profile 176 which matches the similarly profiled lift rod 118. Thus, rotation of the output spool 122 results in corresponding rotation of the lift rod 118 and vice versa.

Figure 6B:
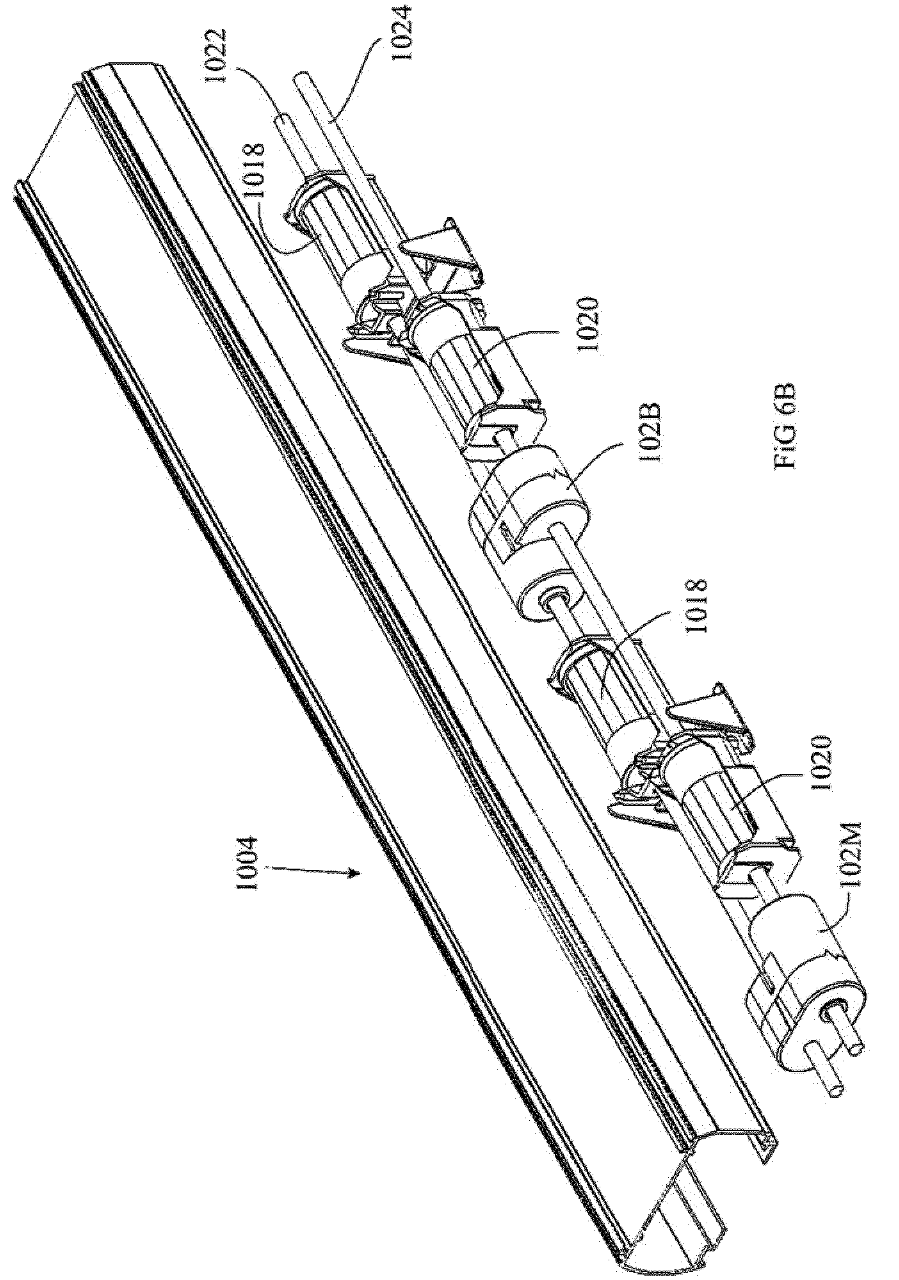
FIG. 6B is a partially exploded perspective view of the head rail of FIG. 6A, incorporating two sets of drives in the head rail.

The storage spool 162 is also a hollow spool, defining a through opening 164 through which another rod, such as another lift rod 118 may extend. However, this opening 164 does not mate with the rod for driving engagement but simply provides a passageway for the rod to pass through. This results in a very compact arrangement for two independent parallel drives as shown in FIG. 6B. This is particularly desirable for the operation of a bottom up/top down shade 1002 as shown in FIG. 6A.

The ability to mount a type of drive-controlling element such as a spring motor or a brake anywhere along a plurality of shafts, as shown in FIG. 6B, permits a wide range of functionality to be achieved. The arrangement shown in FIG. 6B uses one shaft 1022 to raise and lower one part of the covering and another shaft 1024, parallel to the first shaft 1022, to raise and lower another part of the covering, but the use of two or more shafts permits other functions as well. For instance, one shaft could be used to raise and lower the covering and the other could be used to tilt slats on the covering as described in U.S. Pat. No. 6,536,503.

FIGS. 6A and 6B depict a top down/bottom up shade 1002, which uses two spring motor and drag brake combinations 102, one for each lift rod 1022, 1024. The shade 1002 includes a top rail 1004 with end caps 1006, a middle rail 1008 with end caps 1010, a bottom rail 1012 with end caps 1014, a cellular shade structure 1016, spring motor and drag brake combinations 102M, 102B, two bottom rail lift stations 1018, two middle rail lift stations 1020, a bottom rail lift rod 1022, and a middle rail lift rod 1024.

In the case of the top down/bottom up shade 1002 of FIG. 6B, the spring motor and drag brake combinations 102M, 102B, the lift stations 1018, 1020, and the lift rods 1022, 1024, are all housed in the top rail 1004. Both lift rods or shafts 1022, 1024 pass completely through both of the spring motor and drag brake combinations 102M, 102B, but each of the lift rods or shafts 1022, 1024 engages only one of the spring motor and drag brake combinations and passes through the other without engaging it. The front lift rod 1024 operatively interconnects the two lift stations 1020, the spring motor and drag brake combination 102M, and the middle rail 1008 via lift cords 1030 (See FIG. 6A) but just passes through the other spring motor and drag brake combination 102B. The rear lift rod 1022 interconnects the two lift stations 1018, the spring motor and drag brake combination 102B, and the bottom rail 1012 via lift cords 1032 (See FIG. 6A), but just passes through the other spring motor and drag brake combination 102M.

In this instance, the middle rail 1008 may travel all the way up until it is resting just below the top rail 1004, or it may travel all the way down until it is resting just above the bottom rail 1012, or the middle rail 1008 may remain anywhere in between these two extreme positions. The bottom rail 1012 may travel all the way up until it is resting just below the middle rail 1008 (regardless of where the middle rail 1008 is located at the time), or it may travel all the way down until it is extending the full length of the shade 1002, or the bottom rail 1012 may remain anywhere in between these two extreme positions.

Each lift rod 1022, 1024 operates independently of the other, using its respective components in the same manner as described above with respect to a single rod system, with the front rod 1024 operatively connected to the middle rail 1008, and the rear rod 1022 operatively connected to the bottom rail.

Referring briefly to FIG. 6B, the spring motor and drag brake combinations 102B, 102M may be identical or they may differ in that the stepped coil springs 126 may have a different wire diameter (or different wire cross section dimension) in order to customize the holding and release torques for each brake. A larger diameter wire (or larger wire cross section dimension) used in the stepped coil spring 126 results in higher holding and release torques. Whether identical or not, the spring motor and drag brake combination 102B is “flipped over” when installed, relative to the spring motor and drag brake combination 102M. The lift rod 1022 for the bottom rail 1012 goes through the through opening 176 in the output spool 122 (and engages this output spool 122) of the spring motor and drag brake combination 102B. It also passes through the through opening 164 of the storage spool 162 of the spring motor and drag brake combination 102M. Similarly, the lift rod 1024 for the middle rail 1008 goes through the through opening 176 in the output spool 122 (and engages this output spool 122) of the spring motor and drag brake combination 102M. It also passes through the through opening 164 of the storage spool 162 of the other spring motor and drag brake combination 102B.

It should be noted that it is possible to add more spring motors or more spring motor and drag brake combinations, as desired, and that, because these components provide for the shafts or rods 1022, 1024 to pass completely through their housings, they may be located anywhere along the rods 1022, 1024. It should also be noted that this ability to have two or more shafts passing completely through the housing of a spring-operated drive component, with at least one shaft operatively engaging the spring and at least one other shaft not operatively engaging the spring, permits a wide range of combinations of components within a system. The spring-operated drive component may be a spring motor alone, a spring brake alone, a combination spring motor and spring brake as shown here, or other components.

Other Embodiments of Spring Motor and Drag Brake Combinations

FIGS. 7-11 depict another embodiment of a spring motor and drag brake combination 102'. A comparison with FIG. 2 highlights the differences between this embodiment 102' and the previously disclosed embodiment 102. This embodiment includes two “conventional” coil springs 126S, 126L functionally linked together by a spring coupler 127' instead of the single stepped coil spring 126. The first coil spring 126S has a smaller coil diameter, and the second coil spring 126L has a larger coil diameter.

Figure 10:
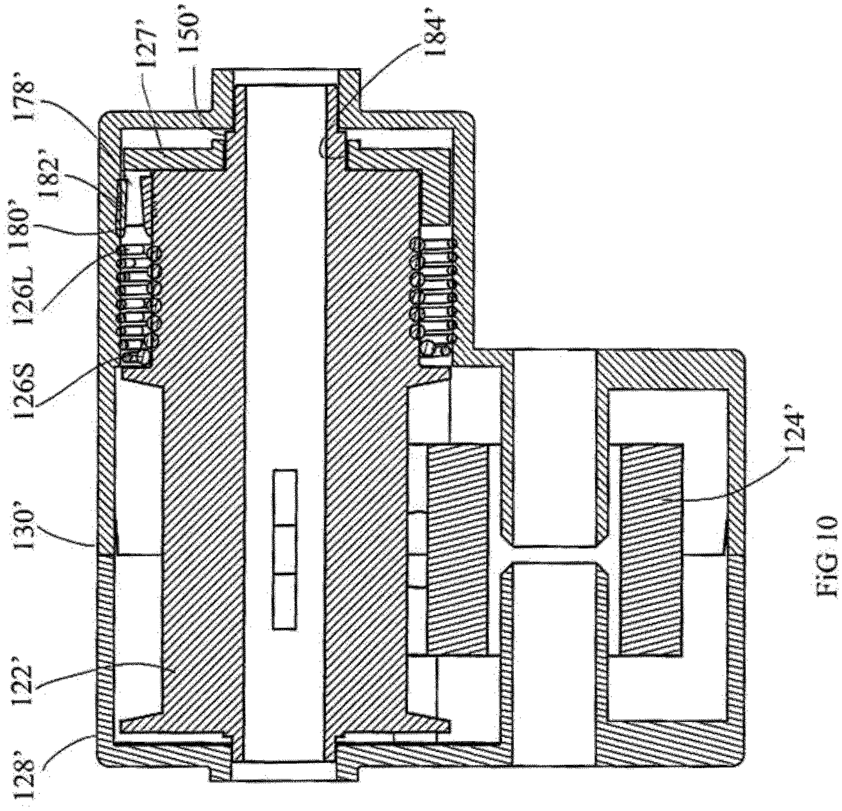
FIG. 10 is a section view along line 10-10 of FIG. 9.
Figure 9:
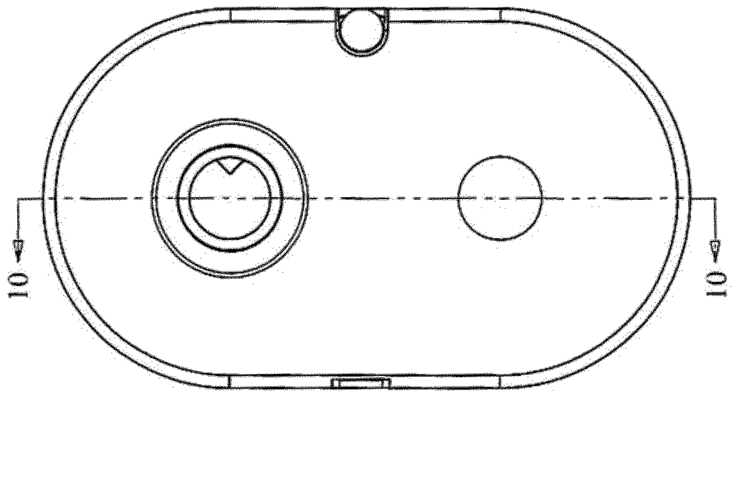
FIG. 9 is an end view of the spring motor of FIG. 8.

The spring coupler 127' is a washer-like device which defines a longitudinal slot 178', which receives the extended ends 180', 182' of the coil springs 126S, 126L, respectively. Since the coil spring 126S has a smaller coil diameter, it fits inside the larger diameter coil spring 126L, and the extended ends 180', 182' lie adjacent to each other within the slot 178', as shown in FIG. 10.

Figure 11:
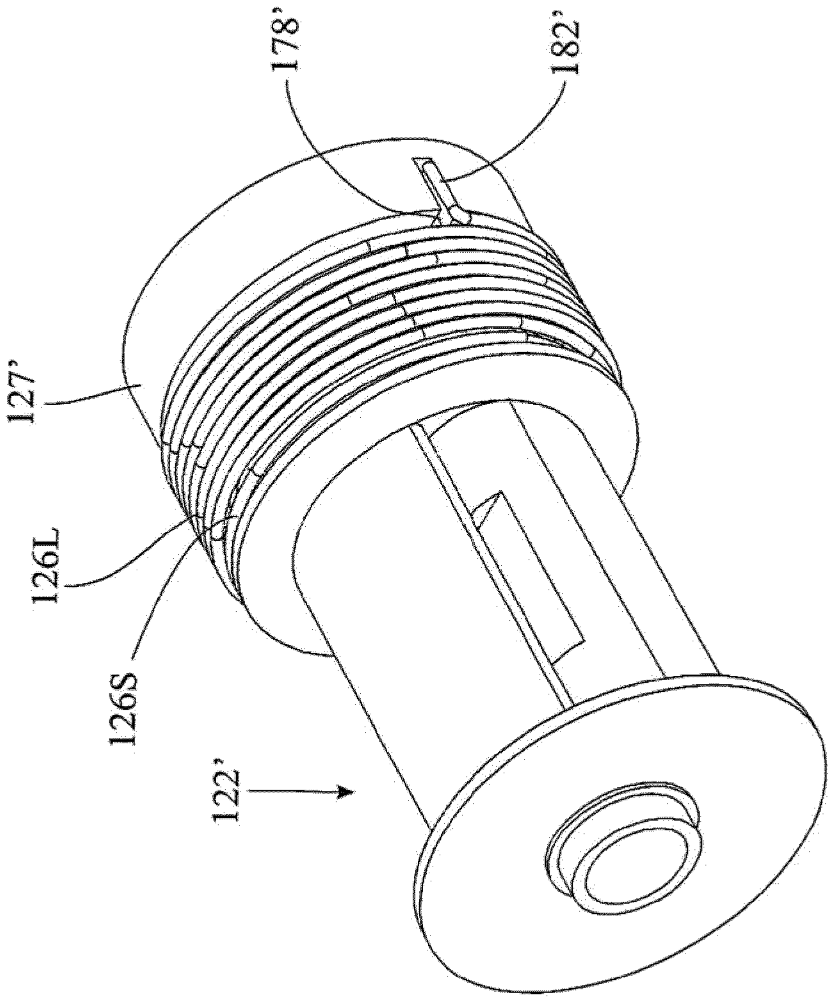
FIG. 11 is a perspective view of the assembled motor output shaft, coil springs, and spring coupler of FIG. 7.

The spring coupler 127' defines a central opening 184' which allows the spring coupler 127' to slide over the stub shaft 150' of the output spool 122'. The spring coupler 127' allows for the two springs 126S, 126L to be made of wires having different diameters (or different wire cross-section dimensions, as the wires do not have to be circular in section as these are) and still act as a single spring when the output spool 122' rotates. FIG. 11 shows the two coil spring 126S, 126L, functionally linked by the spring coupler 127' and mounted on the output spool 122'.

This spring motor and drag brake combination 102' behaves in the same manner as the spring motor and drag brake combination 102 described above, except that the use of two coil springs 126S, 126L allows the flexibility to choose the wire cross section dimension for each coil spring 126S, 126L individually. In this manner, the correct (or the desired) brake torques can be chosen more exactly for each application.

Figures 7, 8:
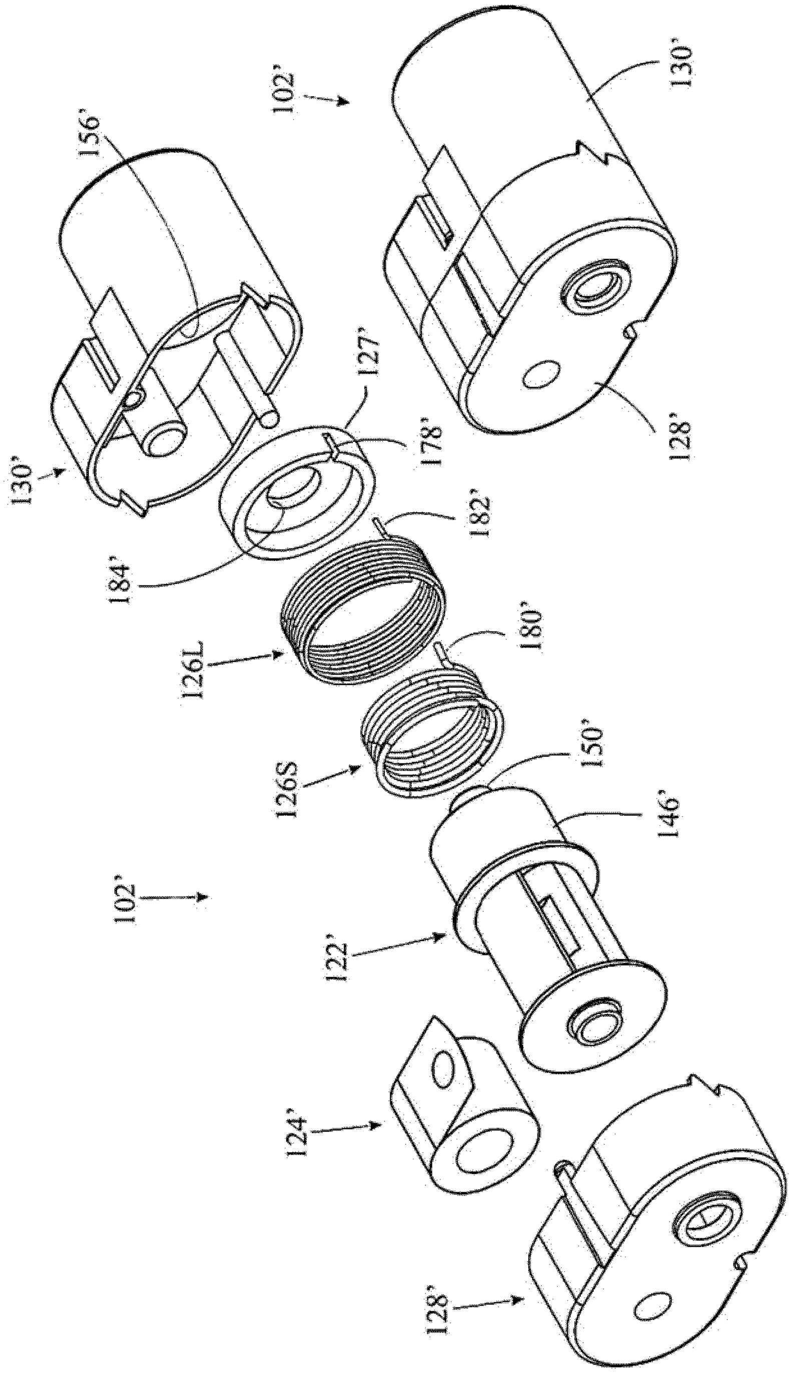
FIG. 7 is an exploded perspective view of another embodiment of a spring motor.
FIG. 8 is a perspective view of the assembled motor of FIG. 7.

For instance, FIG. 7 depicts a larger wire cross section dimension used for the smaller coil spring 126S which clamps around the drag brake drum portion 146' than the wire cross section dimension used for the larger coil spring 126L which clamps inside the drag brake bore 156'. Since the slip torques (the torques at which the coil spring slips past the surface against which it is clamped) are a function of the diameter of the wire cross section used for the coil springs (the larger the wire cross section dimension the higher the slip torque, everything else being equal), the embodiment shown in FIG. 7 has a larger holding torque (the larger of the two torques) than the holding torque of a similar spring motor and drag brake combination having the smaller spring coil 126S of made from a smaller cross-section wire.

FIGS. 12 and 13-15B depict another embodiment of a spring motor and drag brake combination 102". A comparison with FIG. 2 quickly highlights the differences between this embodiment 102" and the previously disclosed embodiment 102. This embodiment 102" includes a number of identical or very similar components such as a motor output spool 122", a flat spring 124" (or motor spring 124"), a motor housing portion 128", a brake housing portion 130", a drag brake drum portion 146", and coil springs 126". As discussed below, some of these items are slightly different from those described with respect to the previous embodiment, and this embodiment 102" also has riding sleeves 127" which are desirable but not strictly necessary for the operation of this spring motor and drag brake combination 102". (Yet another embodiment 102*, shown in FIG. 16, does not use the sleeves.)

A readily apparent difference is that the drag brake drum portion 146" is a separate piece which is rotatably supported on the shaft extension 148" of the motor output spool 122". As may be appreciated from FIG. 15A, the motor output spool 122" is rotatably supported on the housing portions 128", 130", and the drag brake drum portion 146" is rotatably supported on the shaft extension 148" of the motor output spool 122". The motor output spool 122" and the drag brake drum portion 146" have hollow shafts 176", 186" with non-circular profiles (See also FIGS. 12 and 14) so as to engage the lift rod 118.

The brake housing portion 130" includes two "ears" 188" which define axially-aligned slotted openings to releasably secure the curled ends 190" of the coil springs 126" as discussed below.

Figures 12, 13:
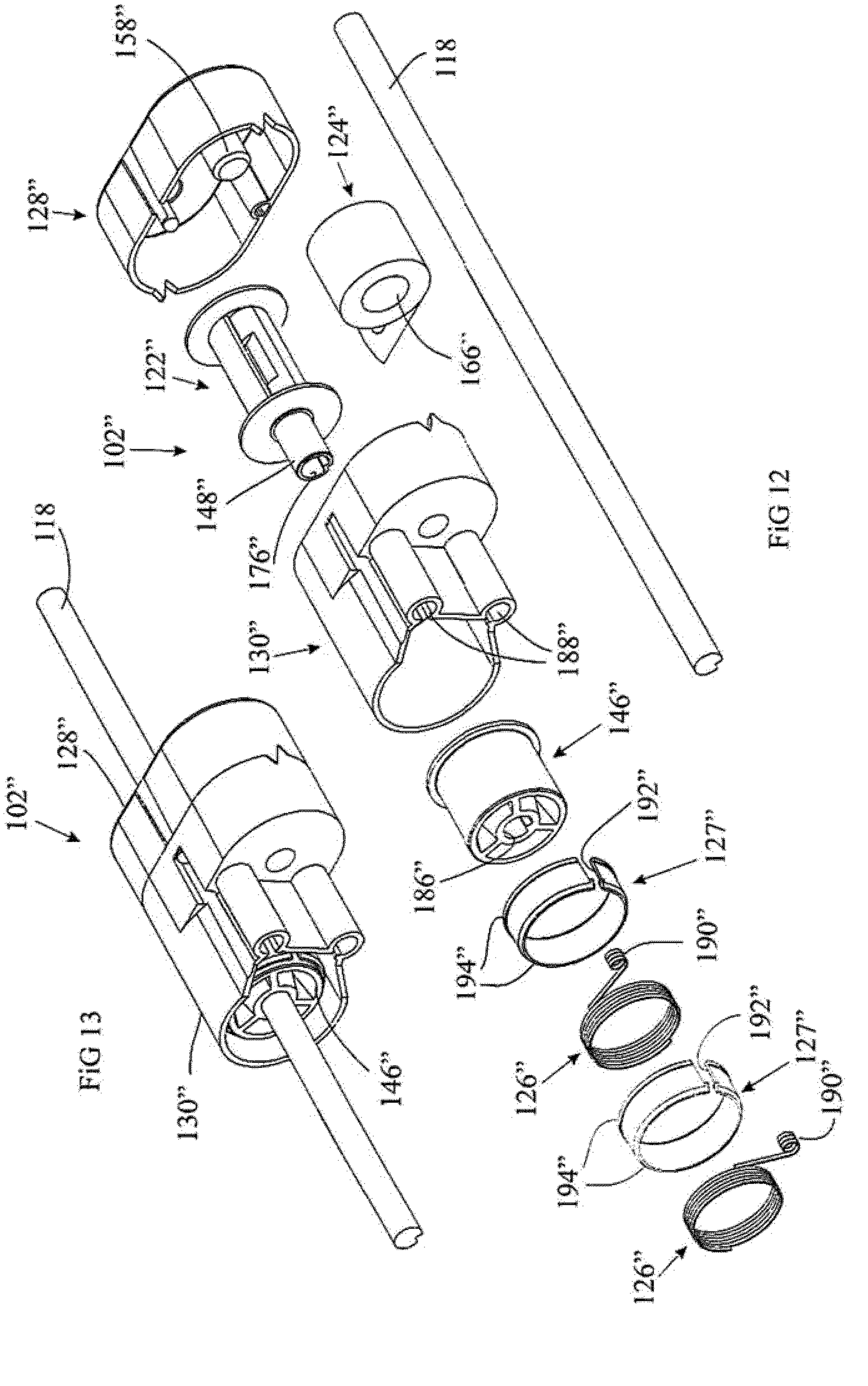
FIG. 12 is an exploded, perspective view of another embodiment of a spring motor.
FIG. 13 is an assembled view of the spring motor of FIG. 12.

The riding sleeves 127" are discontinuous cylindrical rings, with a longitudinal cut 192", which allows the rings to "collapse" to a smaller diameter. Both riding sleeves 127" are identical as are both of the coil springs 126" (though the coil springs 126" may be of different wire diameters if desired to achieve the desired torque). As will become clearer after the explanation of the operation of this spring motor and drag brake combination 102", it is possible to use only one set of riding sleeve 127" and coil spring 126" if desired and adequate. The embodiment 102" of FIG. 12 shows two sets of riding sleeves 127" and coil springs 126", used to obtain a larger holding torque (more braking power). Certainly, additional sets could also be used if desired (and if able to be accommodated on the drag brake drum portion 146"). Also, the use of the riding sleeves 127" is optional, as evidenced by the embodiment 102* of FIG. 16 which is described in more detail later.

The coil springs 126" may ride directly on the outer diameter of the drag brake drum portion 146", but the use of the riding sleeves 127" allows for more flexibility in choosing appropriate materials for the drag brake drum portion 146" and for the riding sleeves 127". For instance, the riding sleeves 127" may be advantageously made from a material with some flexibility (so that they can collapse onto the outer diameter of the drag brake drum portion 146"), and with some self-lubricating property. Furthermore, if riding sleeves 127" are used, it is possible to simply replace the riding sleeves 127" in the event of high wear between the coil springs 126" and the riding sleeves 127", instead of having to replace the drag brake drum portion 146". The rest of the description describes only one set of riding sleeve 127" and coil spring 126" (unless otherwise noted), with the understanding that two or more sets may also be used with essentially the same operating principle but with possibly advantageous results as discussed above.

The flat spring 124" is assembled to the motor output spool 122" in the same manner as has already been described for the motor output spool 122 of FIG. 2. The assembled flat spring 124" and motor output spool 122" are then assembled into the motor housing portion 128" and the brake housing portion 130" with the opening 166" of the flat spring 124" sliding over the hollow shaft projections 158" and 160" of the motor housing portion 128" and the brake housing portion 130", respectively.

Figure 15A:
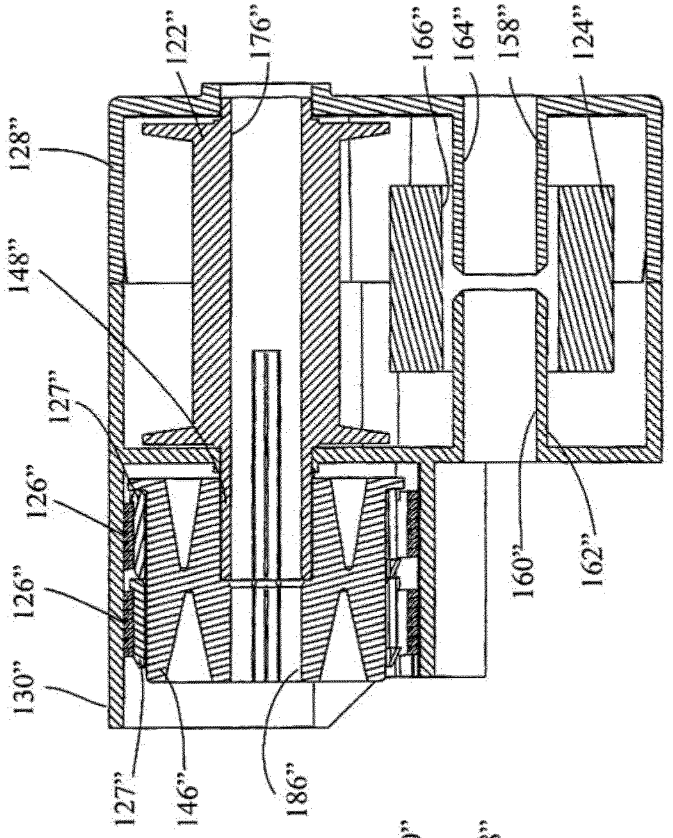
FIG. 15A is a section view along line 15-15 of FIG. 14.
Figure 15B:
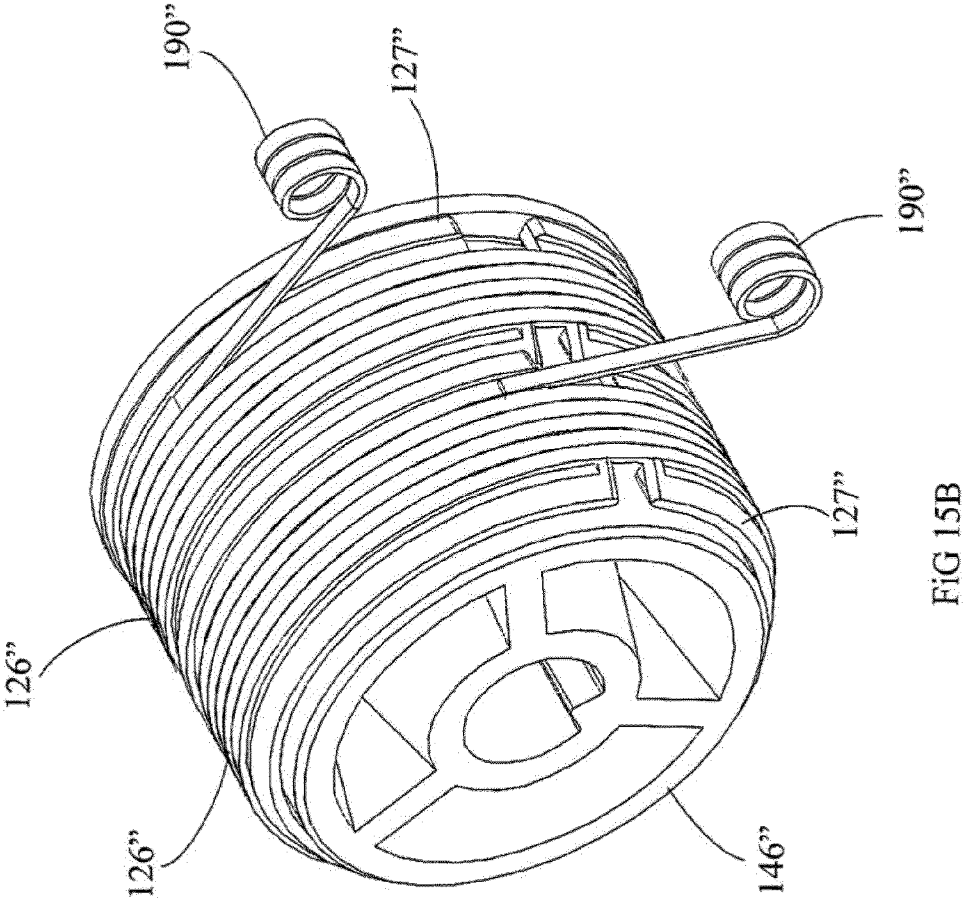
FIG. 15B is a perspective view of the assembled drag brake drum, riding sleeves, and coil springs of FIG. 12.

The riding sleeves 127" and the coil springs 126" are then assembled onto the drag brake drum portion 146" as shown in FIG. 15B, wherein the riding sleeves 127" and the coil springs 126" are mounted in series onto the outer diameter of the drag brake drum portion 146". The coil spring 126" is mounted onto its corresponding riding sleeve 127" such that the curled end 190" of the coil spring 126" projects through the slotted opening 192" of the riding sleeve 127". Each riding sleeve 127" includes circumferential flanges 194" at each end to assist in keeping the coil spring 126" from slipping off its corresponding riding sleeve 127" during operation of the spring motor and drag brake combination 102".

The assembled drag brake drum portion 146", coil springs 126", and riding sleeves 127" are then mounted onto the extended shaft 148" of the motor output spool 122", making sure that the curled end 190" of each coil spring 126" is caught in one of the slotted openings 188" of the brake housing portion 130". The drag brake drum portion 146" is rotated until the non-circular profiles 176", 186" of the motor output spool 122" and of the drag brake drum portion 146" respectively are aligned such that the lift rod 118 can be inserted through the entire assembly as shown in FIG. 13.

During operation, as shown from the vantage point of FIG. 12, as the motor output spool 122" is rotated counterclockwise (corresponding to the lowering of the shade 100 and the transfer of the flat spring 124" from the storage spool 162" to the motor output spool 122"), both the motor output spool 122" and the drag brake drum portion 146" rotate in this counterclockwise direction. The riding sleeves 127" are also urged to rotate in this same direction (due to the friction between the riding sleeves 127" and the drag brake drum portion 146"), and the coil springs 126" are also urged to rotate in this same direction (due to the friction between the riding sleeves 127" and the coil springs 126"). However, the curled ends 190" of the coil springs 126" are secured to the brake housing portion 130" and are prevented from rotation, so, as the rest of the coil springs 126" begin rotating in the counterclockwise direction, the coil springs 126" tighten onto the riding sleeves 127". The riding sleeves 127" collapse slightly onto the outer diameter of the drag brake drum portion 146", thus providing an increased resistance to rotation of the drag brake drum portion 146" (and of the lift rod 118 which is engaging the drag brake drum portion 146").

When lifting the shade 100, the spring motor and drag brake combination 102" assists the user as the flat spring 124" unwinds from the motor output spool 122" (which is therefore rotating clockwise) and winds onto the storage spool 162". The drag brake drum portion 146" also rotates clockwise, which urges the riding sleeves 127" and the coil springs 126" to rotate clockwise. Again, since the curled ends 190 of the coil springs 126" are secured to the slotted openings 188" of the brake housing portion 130", the coil springs 126" "grow" or expand, increasing their inside diameter and greatly reducing the braking torque on the riding sleeves 127" and on the drum portion 146". The drag brake drum portion 146" is therefore able to rotate with little resistance from the coil springs 126". The user thus can raise the shade 100 easily, assisted by the spring motor and drag brake combination 102".

Figure 12A:
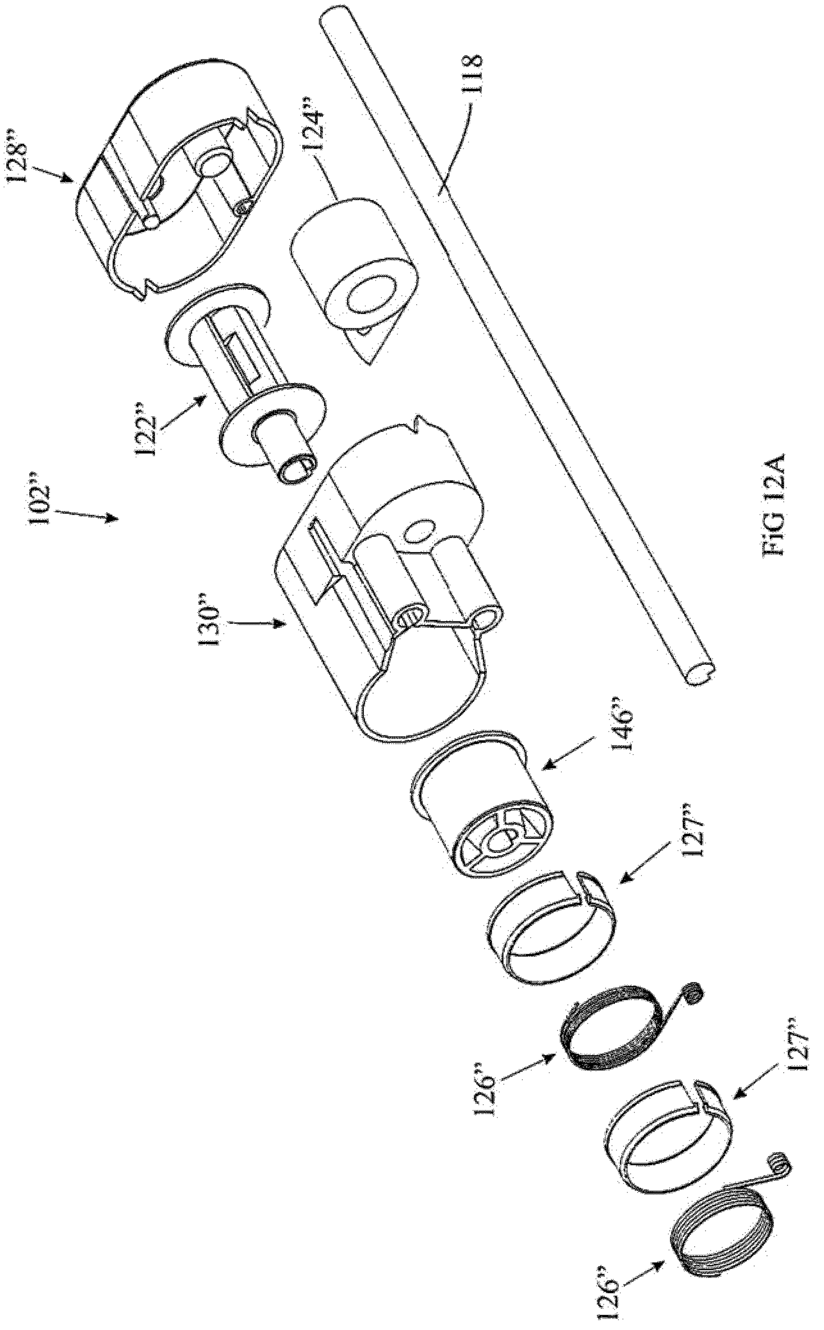
FIG. 12A is an exploded, perspective view similar to that of FIG. 12 of another embodiment of a spring motor.
Figure 14:
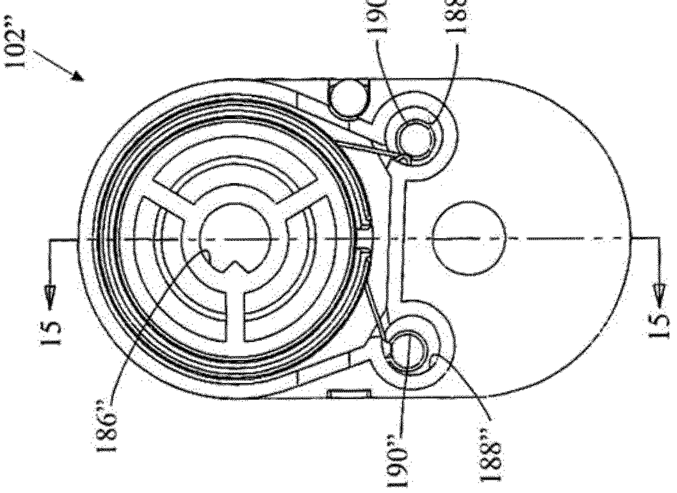
FIG. 14 is an end view of the spring motor of FIG. 13.

FIG. 12A depicts the same embodiment of a spring motor and drag brake combination 102'" as FIG. 12, except that one of the coil springs 126" has been flipped over 180 degrees relative to the coil spring 126", and it is made from a wire material which has a thinner cross section. Now, when the drag brake drum portion 146" rotates clockwise, the riding sleeves 127" and the coil springs 126" also to rotate clockwise. However, in this instance, clockwise rotation causes the second coil spring 126" to tighten down onto its riding sleeve 127", reducing the inside diameter of the riding sleeve 127" and thus clamping down on the drag brake drum portion 146". Since the cross sectional diameter of this second coil spring 126" is smaller than the cross sectional diameter of the first coil spring 126", the drag torque applied to the drag brake drum portion 146" when it rotates in a clockwise direction is smaller than the drag torque applied to the drag brake drum portion 146" when the rotation is in a counterclockwise direction. If the cross-sectional dimension of the wire of the second coil spring were greater than the cross-sectional dimension of the wire of the first coil spring 126", then the braking torque would be greater in the clockwise direction. If the two coil springs 126" were identical but still reversed from each other, then the braking torque would be the same in both directions.

Figures 16, 17:
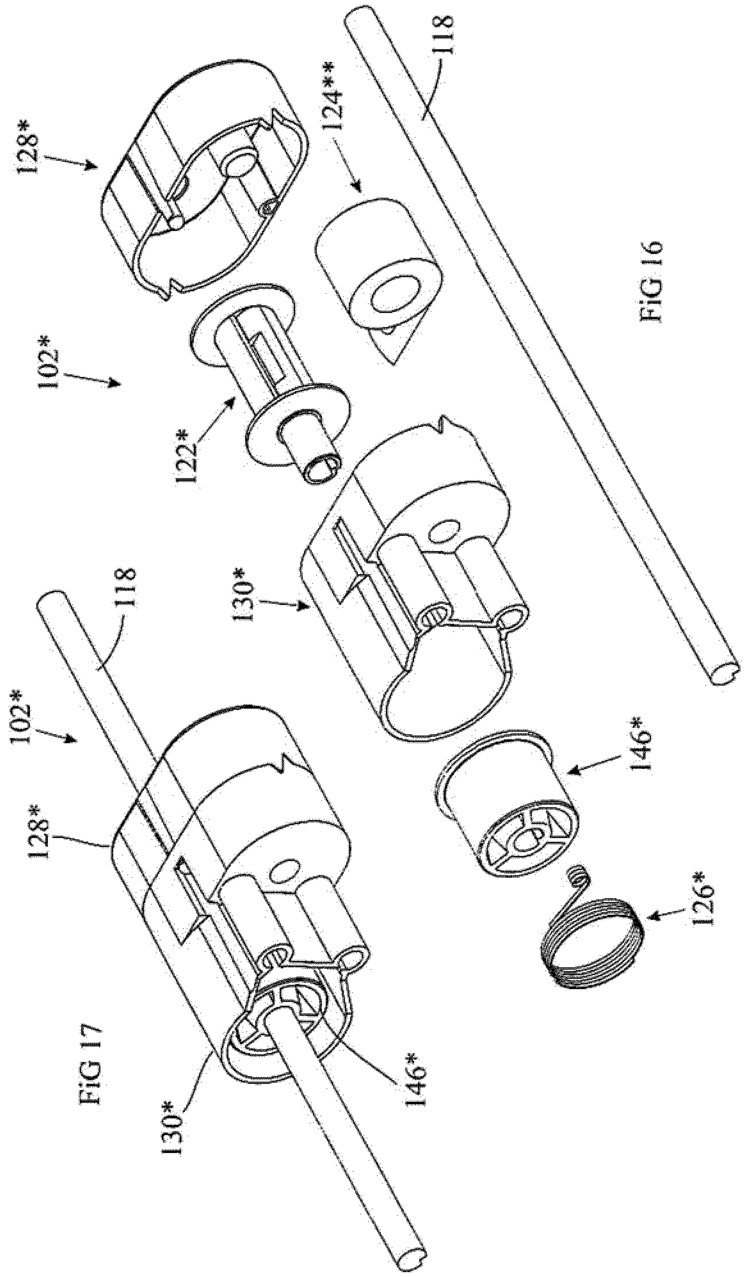
FIG. 16 is an exploded, perspective view of another embodiment of a spring motor.
FIG. 17 is an assembled view of the spring motor of FIG. 16.

FIGS. 16 and 17 depict another embodiment of a spring motor and drag brake combination 102*. A comparison with FIG. 12 shows that this embodiment 102* is substantially identical to the previously disclosed embodiment 102" except that this embodiment does not have the riding sleeves 127" and it only has a single coil spring 126*. However, two or more such coil springs 126* may be used if desired, as was the case with the previously described embodiment 102". The coil spring 126* rides directly on the outer diameter of the drag brake drum portion 146* instead of using the riding sleeves 127". Other than these differences, this spring motor and drag brake combination 102* operates in essentially the same manner as the previously described embodiment 102".

It should be noted that in this spring motor and drag brake combination 102*, as is the case with all of the spring motor and drag brake combinations described herein, the coil spring 126 or the flat spring 124 may be omitted from the assembly. If the coil spring 126** is omitted, the spring motor and drag brake combination 102* operates as a spring motor only, with no drag brake capability. Likewise, if the flat spring 124** is omitted, the spring motor and drag brake combination 102* operates as a drag brake only, with no motor capability.

Figure 18:
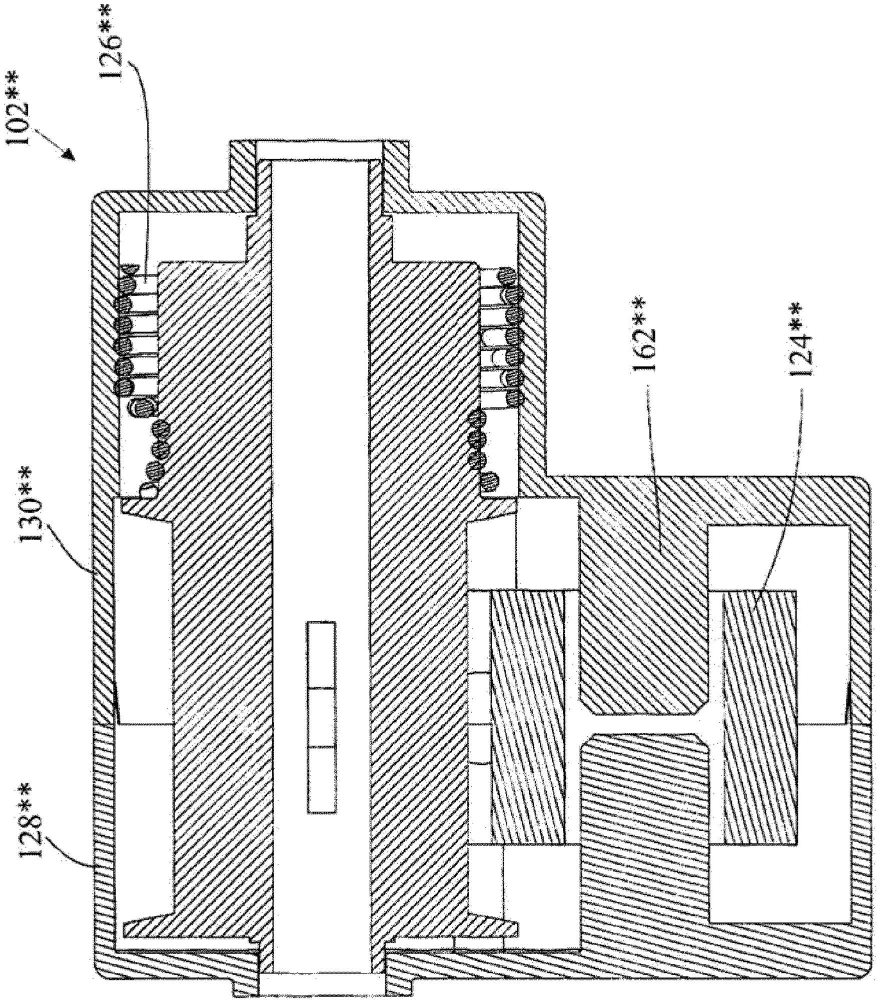
FIG. 18 is a section view similar to that of FIG. 15, but for the spring motor of FIG. 17.

FIG. 18 depicts another embodiment of a spring motor and drag brake combination 102. A comparison with FIG. 5 shows that this embodiment 102 is substantially identical to the embodiment 102 except that, in this spring motor and drag brake combination 102**, the storage spool 162* is not a hollow spool as was the case for the previously described embodiment 102. So, in this case, a lift rod cannot pass through the storage spool 162*. Other than this difference, this spring motor and drag brake combination 102** operates in essentially the same manner as the embodiment 102.

Figure 19:
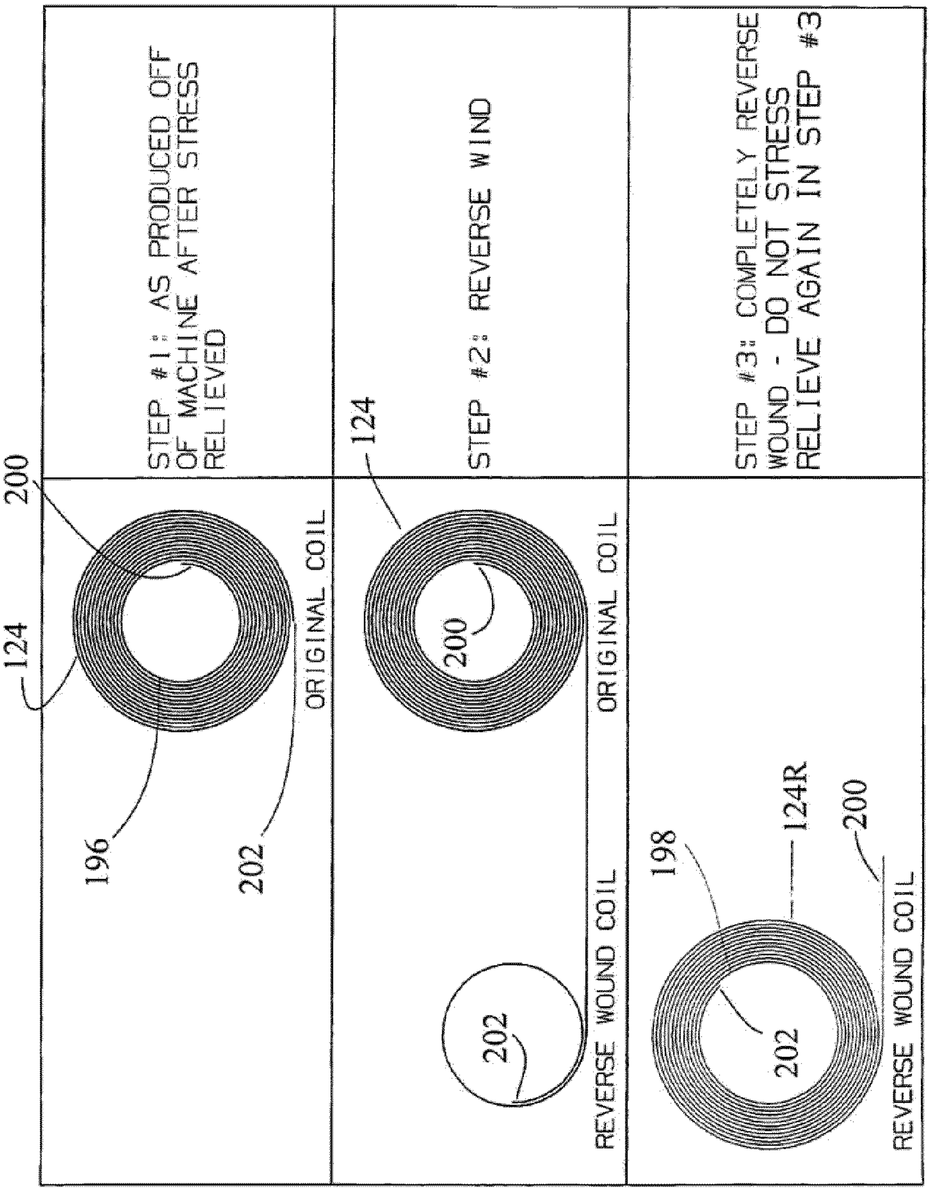
FIG. 19 is a schematic of the three steps involved in the reverse winding of a flat spring motor.
Figure 20:
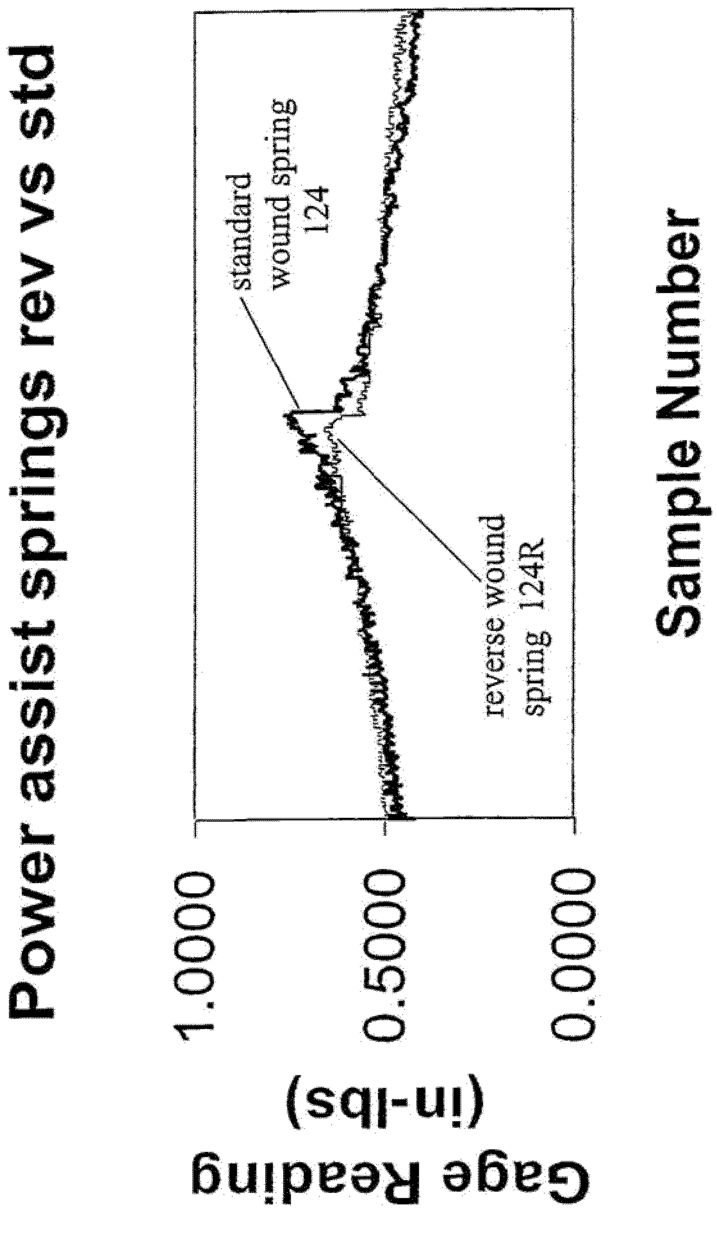
FIG. 20 is graph showing the torque curves of a standard-wound spring and a reverse-wound spring.

FIGS. 19 and 20 depict an embodiment of a flat spring (or motor spring), which may be used in the embodiments described in this specification, if desired. The flat spring 124, shown in step #1, is made by tightly wrapping a flat metal strip onto itself, after which the coil is stress relieved. This flat spring defines an inside diameter 196, which, in this embodiment, is 0.25 inches. The spring 124 as shown at the end of step #1 may be used in the embodiments described above, or the spring may undergo additional steps, as shown in FIG. 19.

In step #1, the coil spring 124 is first wound such that the first end 200 of the spring 124 is inside the coil and the second end 202 of the spring 124 is outside the coil. The coil spring 124 is then stress relieved so it takes the coil set shown in FIG. 1, with the spring having a smaller radius of curvature at its first (inner) end and gradually and continuously increasing to its second (outer) end. Next, in step #2, the coil spring 124 is reverse wound until it reaches the position shown in step #3, in which the end 200 of the spring 124 (having the smaller coil set radius of curvature) is now outside the coil and the end 202 of the spring 124 (having the larger coil set radius of curvature) is now inside the coil, with the coil set radius of curvature gradually and continuously decreasing from the inner end to the outer end. This reverse-wound coil 124R is not stress relieved again. Also, this reverse-wound coil 124R defines an inside diameter 198 which preferably is slightly larger than the inside diameter 196 of the original flat spring 124. In this embodiment 124R, the inside diameter is 0.29 inches.

FIG. 20 graphically depicts the power assist torque curve for the standard-wound flat spring 124 (as it stands at the end of step #1) and contrasts it with the torque curve for the reverse-wound flat spring 124R at the end of step #3 of FIG. 19. It depicts the torque forces from the moment the springs begins to unwind (far left of the graph) until they are fully unwound (this is the point, toward the middle of the graph, where the curves show a sharp drop) and then back until the springs are fully rewound (far right of the graph). It can be appreciated that the power assist torque curve for the reverse-wound flat spring 124R is a flatter curve across the entire operating range of the spring than that of the standard-wound flat spring 124. This flatter torque curve is typically a desirable characteristic for use in the type of spring motors used for raising and lowering window coverings.

Referring briefly now to FIG. 2, if one replaces the flat spring 124 with the reverse-wound spring 124R of FIG. 19, the end 200 of the reverse-wound spring 124 (which has the smaller coil set radius of curvature) is the end 142 with the hole 144 that allows it to be attached to the output spool 122. The lever arm acting on the output spool 122 is defined as the distance from the axis of rotation of the output spool 122 to the surface 132 of the output spool 122. This lever arm is at a minimum when the reverse-wound spring 124R is substantially unwound from the output spool 122 and substantially wound onto itself. Therefore, with this arrangement, the portion of the reverse-wound spring 124R which has the highest spring rate (the smallest coil set radius of curvature) is acting on the smallest lever arm.

When the reverse-wound spring 124R is substantially wound onto the output spool 122, the lever arm acting on the output spool 122 will have increased by the thickness of the spring coil which is now wound onto the output spool 122. The lever arm will therefore be at a maximum when the lowest spring rate of the reverse-wound spring 124R (the portion with the largest coil set radius of curvature) is acting on the output spool. The end result is a smoothing out of the power assist torque curve, as shown in FIG. 20.

The procedure depicted in FIG. 19 for reverse winding the spring 124 is but one way to vary the spring rate along the length of the spring while maintaining a uniform thickness and width of the metal strip that forms the spring. Similar results may be obtained using other procedures, and it is possible to design the coil set curvature of the spring 124 to obtain a torque curve with a negative slope, or any other desired slope.

For instance, the metal strip that forms the spring 124 may be drawn across an anvil at varying angles to change the coil set rate of curvature (and therefore the spring rate) for various portions of the spring 124, without changing other physical parameters of the spring. By changing the angle at which the metal is drawn across the anvil, the spring rate may be made to increase continually or decrease continually from one end of the spring to the other, or it may be made to increase from one end to an intermediate point, stay constant for a certain length of the coil, and then decrease, or increase and then decrease, or to vary stepwise or in any other desired pattern, depending upon the application for which it will be used. The coil set radius of curvature of the spring may be manipulated as desired to create the desired spring force at each point along the spring in order to result in the desired power assist torque curve for any particular application.

The coil set radius of curvature in the prior art generally is either constant throughout the length of the flat spring or continuously increases from the inner end 200 to the outer end 202, with the outer end 202 connected to the output spool of the spring motor. However, as explained above, a flat spring may be engineered so that a portion of the flat spring that is farther away from the end that is connected to the output spool may have a coil set with a larger radius of curvature than a portion of the flat spring that is closer to the end that is connected to the output spool, as is the case with the reverse wound spring shown in step #3 of FIG. 19 and as is the case in many of the other engineered flat spring arrangements described above. The coil set radius of curvature may have a third portion still farther away from the end that is connected to the output spool that is smaller than the larger radius portion, or it may remain constant from the larger radius portion to the other end, and so forth.

Additional Embodiment of a Drive Motor with a Pass-Through Feature

Figure 21:
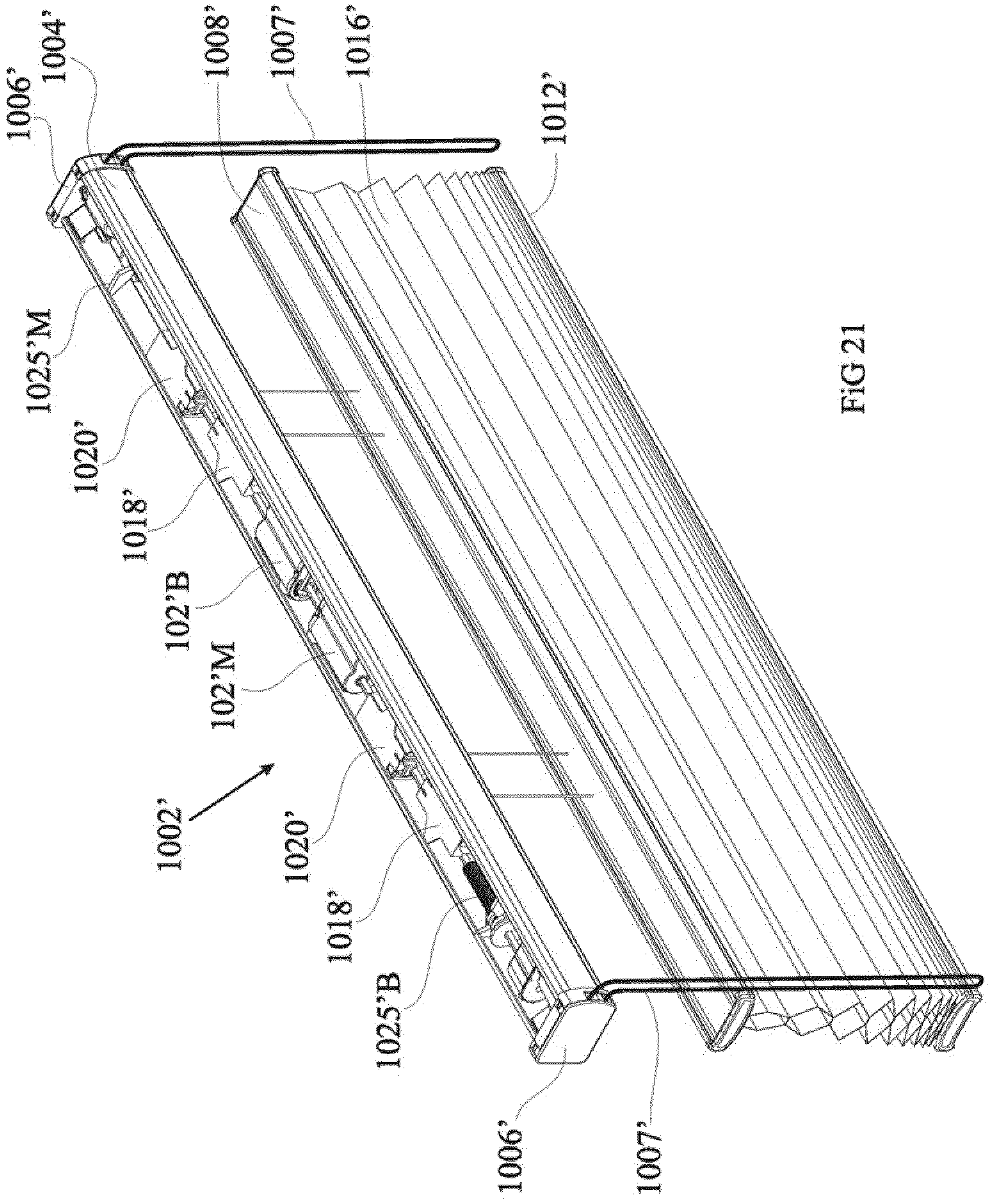
FIG. 21 is a perspective view of a top down/bottom up shade incorporating another embodiment of a spring motor.
Figure 22:
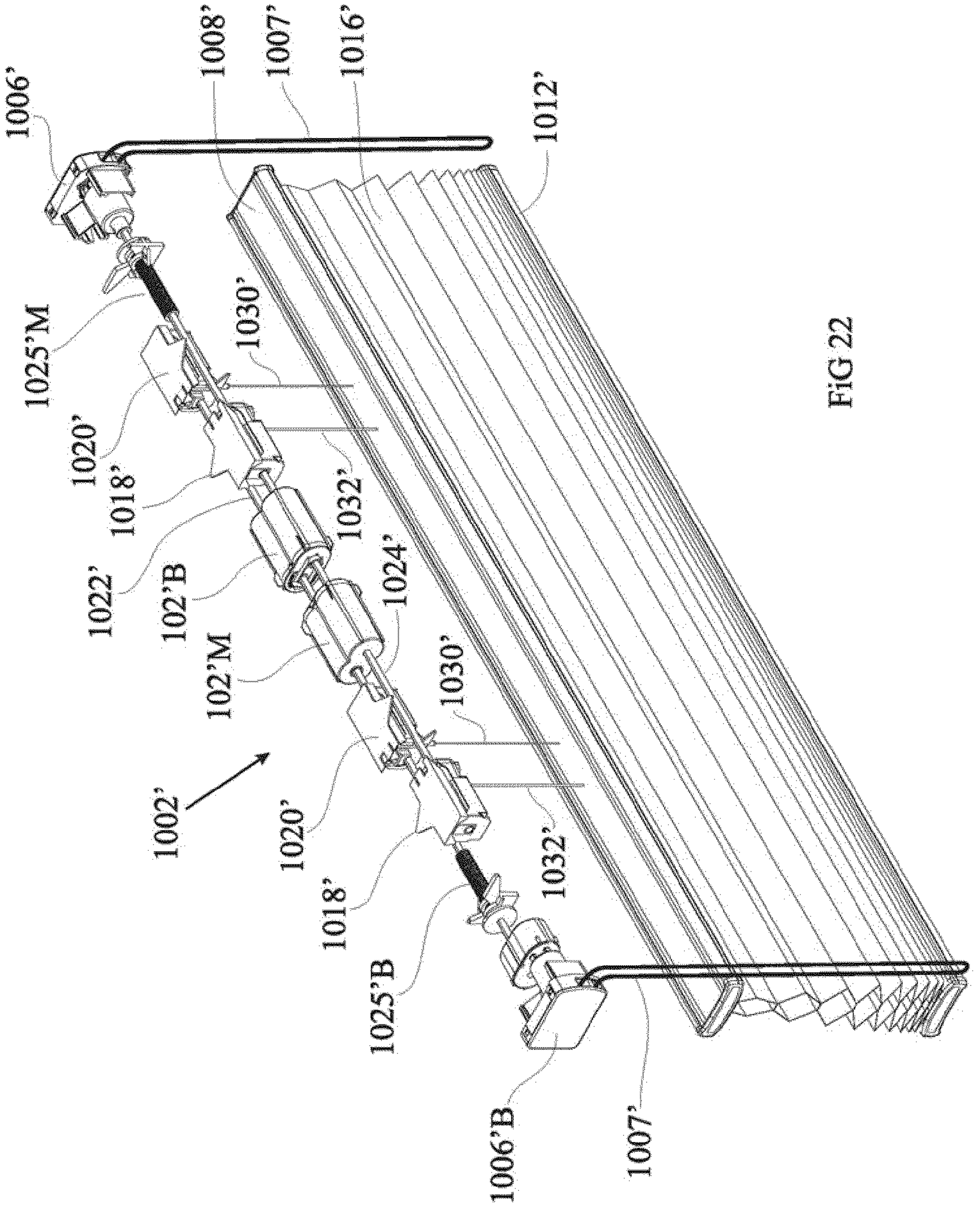
FIG. 22 is a partially exploded perspective view of the shade of FIG. 21, with the top head rail removed for clarity.

FIGS. 21 and 22 depict a top down/bottom up shade 1002', similar to the shade 1002 of FIGS. 6A and 6B, which uses two spring motors 102', one for each lift rod 1022', 1024'. The shade 1002' includes a top rail 1004' with drive units 1006'B, 1006'M, a middle rail 1008', a bottom rail 1012', a cellular shade structure 1016', spring motors 102'M, 102'B, two bottom rail lift stations 1020', two middle rail lift stations 1018', a bottom rail lift rod 1022', a middle rail lift rod 1024', a middle rail drop-limiter 1025'M and a bottom rail drop limiter 1025'B. The lift stations 1020', 1018' and their operating principles are disclosed in U.S. Pat. No. 6,536,503 "Modular Transport System for Coverings for Architectural Openings", issued Mar. 25, 2003, which is hereby incorporated herein by reference.

It should be noted that both the middle rail 1008' and the bottom rail 1012' are movable rails, which are operatively connected to the shade 1002' for extending and retracting the shade 1002'.

In the case of the top down/bottom up shade 1002' of FIGS. 21 and 22, the spring motors 102'M, 102'B, the lift stations 1018', 1020', the rail drop-limiters 1025'M, 1025'B, the drive units 1006'M, 1006'B, and the lift rods 1022', 1024', are all housed in the top rail 1004'. Both lift rods 1022', 1024' pass completely through both of the spring motors 102'M, 102'B, but each of the lift rods 1022', 1024' engages only one of the spring motors and passes through the other without-engaging it. The middle rail lift rod 1024' operatively interconnects the two middle rail lift stations 1018', the spring motor 102'M, and the middle rail 1008' via lift cords 1032', but simply passes through the other spring motor 102'B. The bottom rail lift rod 1022' operatively interconnects the two bottom rail lift stations 1020', the spring motor 102'B, and the bottom rail 1012' via lift cords 1030', but simply passes through the other spring motor 102'M, as described later.

In this instance, the middle rail 1008' may travel all the way up until it is resting just below the top rail 1004', or it may travel all the way down until it is resting just above the bottom rail 1012', or the middle rail 1008' may remain anywhere in between these two extreme positions. The bottom rail 1012' may travel all the way up until it is resting just below the middle rail 1008' (regardless of where the middle rail 1008' is located at the time), or it may travel all the way down until it is extending the full length of the shade 1002', or the bottom rail 1012' may remain anywhere in between these two extreme positions.

Each lift rod 1022', 1024' operates independently of the other, using its respective components, with the middle rail lift rod 1024' operatively connected to the middle rail 1008', and the bottom rail lift rod 1022' operatively connected to the bottom rail 1012'. It should be noted that the drive units 1006'M, 1006'B (described in detail later) depicted are cord drives (with drive cords 1007') which incorporate a brake mechanism to prevent the shade from moving (either creeping up or falling down) once the user releases the cord 1007'. The drop limiters 1025'M, 1025'B (described in detail later) prevent the over-rotation of their respective lift rods 1024', 1022' once the shade has reached its fully extended position. The drop limiters 1025'M, 1025'B prevent the possibility of having the motors 102'M. 102'B unwind fully from the output spool onto the storage spool and then start winding back up again onto the output spool in the opposite direction, which could happen if the user continues to pull on the cord 1007' of the cord drive 1006'M, 1006'B in the same direction once the shade is fully extended. The drop limiters 1025'M, 1025'B preclude this possibility by providing a physical stop which does not permit the further rotation of their respective lift cords 1024', 1022', as described below.

Figure 34:
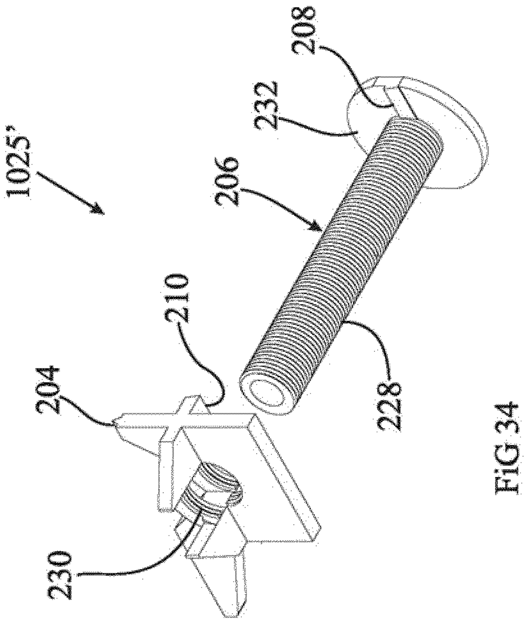
FIG. 34 is an exploded perspective view of the drop limiter of FIG. 33.
Figure 33:
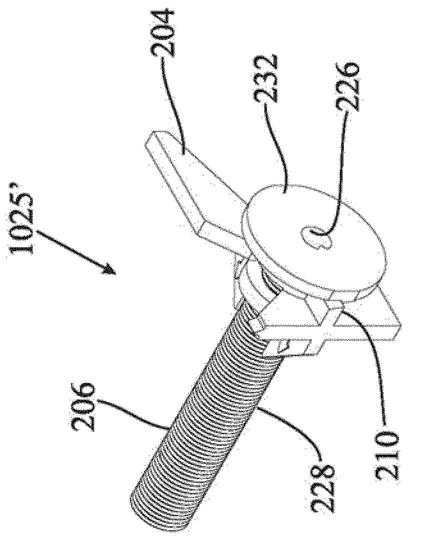
FIG. 33 is a perspective view of the drop limiter of FIG. 22.

The drop limiters 1025'M, 1025'B are identical to each other and will be referred to generically as 1025'. Referring to FIGS. 33 and 34, each drop limiter 1025' includes an internally threaded base 204 which snaps into and is fixedly secured to the head rail 1004' to prevent relative motion between the base 204 and the head rail 1004'. A hollow, externally threaded rod 206 defines an internal profile 226 which closely matches the profile of the lift rods 1024', 1022' such that the rod 206 may slide axially along the longitudinal direction of its corresponding lift rod but is also rotationally driven by and rotates with its corresponding lift rod. The external threads 228 of the rod 206 engage the internal threads 230 of the base 204.

The hollow rod 206 includes a flange 232 at one end, which defines a radially-directed and axially-extending shoulder 208, and the base 204 likewise defines a shoulder 210 which acts as a stop to prevent the further rotation of the rod 206 when the shoulder 208 on the hollow rod 206 contacts the shoulder 210 on the base 204. In operation, the base 204 is snapped into the head rail 1004' and one of the lift rods 1024', 1022' is routed through the hollow rod 206 of the drop limiter 1025'M or 1025'B. The hollow rod 206 is threaded into its respective base 204 to the desired position such that, when its corresponding rail of the shade 1002' is in the fully extended position, the shoulder 208 of the hollow rod 206 is abutting the shoulder 210 of the base 204. As the shade 1002' is raised, the rotation of the corresponding lift rod 1024' or 1022' drives the hollow rod 206, causing it to rotate relative to its respective base 204, which causes the hollow rod to slide longitudinally (in the axial direction) along its corresponding lift rod 1024' or 1022', causing the shoulder 208 of the hollow rod 206 to move away from the shoulder 210 on the base 204.

When the action is reversed and the shade 1002' is lowered, the hollow rod 206 is driven in the opposite rotational direction relative to the base 204 by its corresponding lift rod 1024' or 1022', which causes it to slide longitudinally (in the axial direction) along its corresponding lift rod 1024' or 1022' until the shoulder 208 of the hollow rod 206 contacts the shoulder 210 of the base 204 (when its corresponding lift rod 1024' or 1022' reaches the fully extended position). The abutting of the shoulder 208 of the hollow rod 206 against the shoulder 210 of the base 204 stops the rotation of the hollow rod 206, which, in turn, stops the rotation of the corresponding lift rod 1024' or 1022' that extends through the hollow rod 206, thus preventing the over-rotation of the corresponding spring motor 102'M or 102'B or of the corresponding drive 1006'M, 1006'B, which are operatively connected to their corresponding lift rod 1024' or 1022'.

The spring motors 102'M, 102'B are identical to each other and will be referred to generically as 102'. Referring now to FIGS. 23-27, the spring motor 102' includes a motor output spool 122', a flat spring 124' (also referred to as a motor spring 124'), a storage spool 126', a motor housing 128', a housing cover 130', and a support plate 212'. The motor housing 128' and the housing cover 130' snap together to form a complete housing.

The motor output spool 122' (See also FIG. 27) includes a spring take-up portion 132', which is flanked by beveled left and right shoulders 134', 136', respectively, and defines a flat recess 138' including a raised button 140' (See FIG. 26) for securing a first end 142' of the flat spring 124' to the motor output spool 122'. The first end 142' of the flat spring 124' is inserted into the flat recess 138' of the spring take-up portion 132' until the raised button 140' of the spring take-up portion 132' snaps through the opening 144' at the first end 142' of the flat spring 124', releasably securing the flat spring 124' to the motor output spool 122'.

Figures 25, 26, 27:
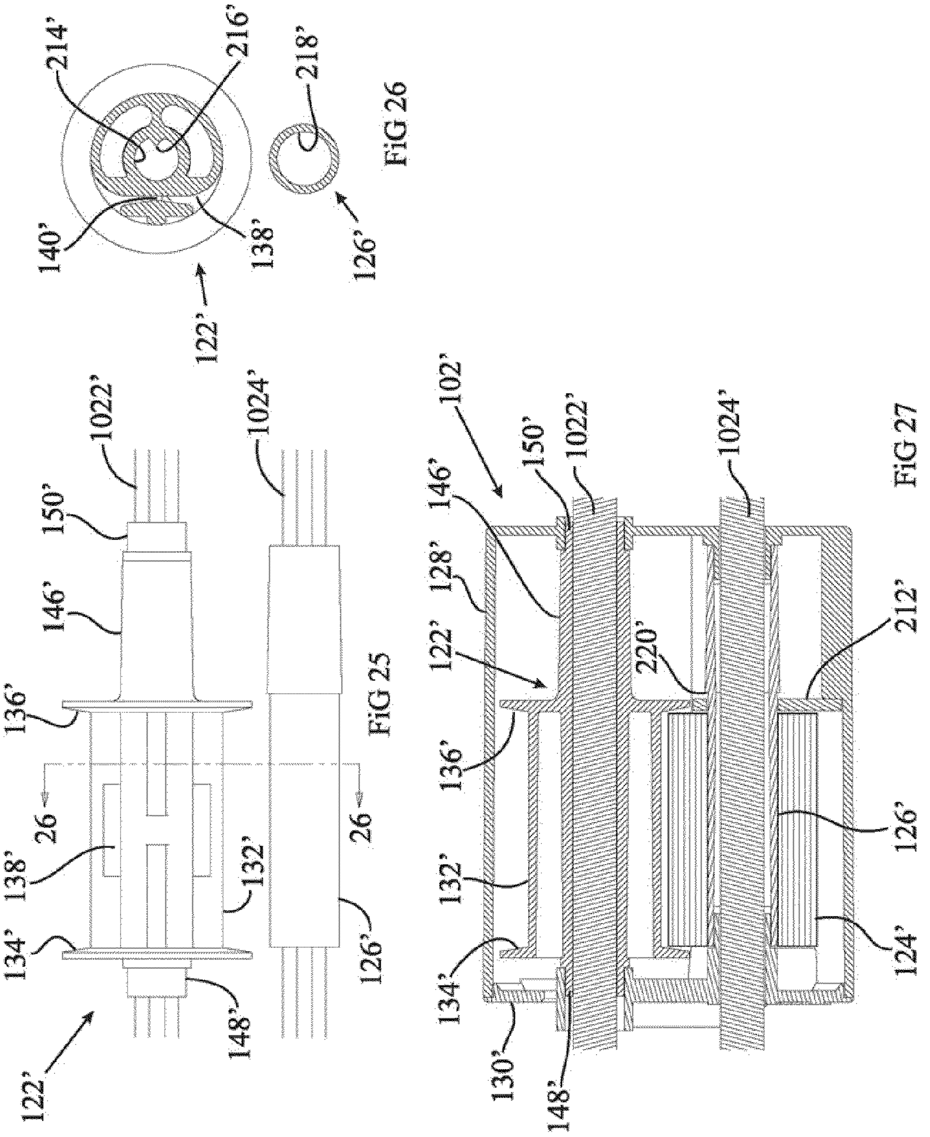
FIG. 25 is a plan view of the spring motor of FIG. 23, with the housing and the spring removed for clarity, and incorporating the two lift rods of FIG. 22.
FIG. 26 is a section view along the line 26-26 of FIG. 25, with the lift rods removed for clarity.
FIG. 27 is a section view along line 27-27 of FIG. 23, and incorporating the two lift rods of FIG. 22.
Figure 29:
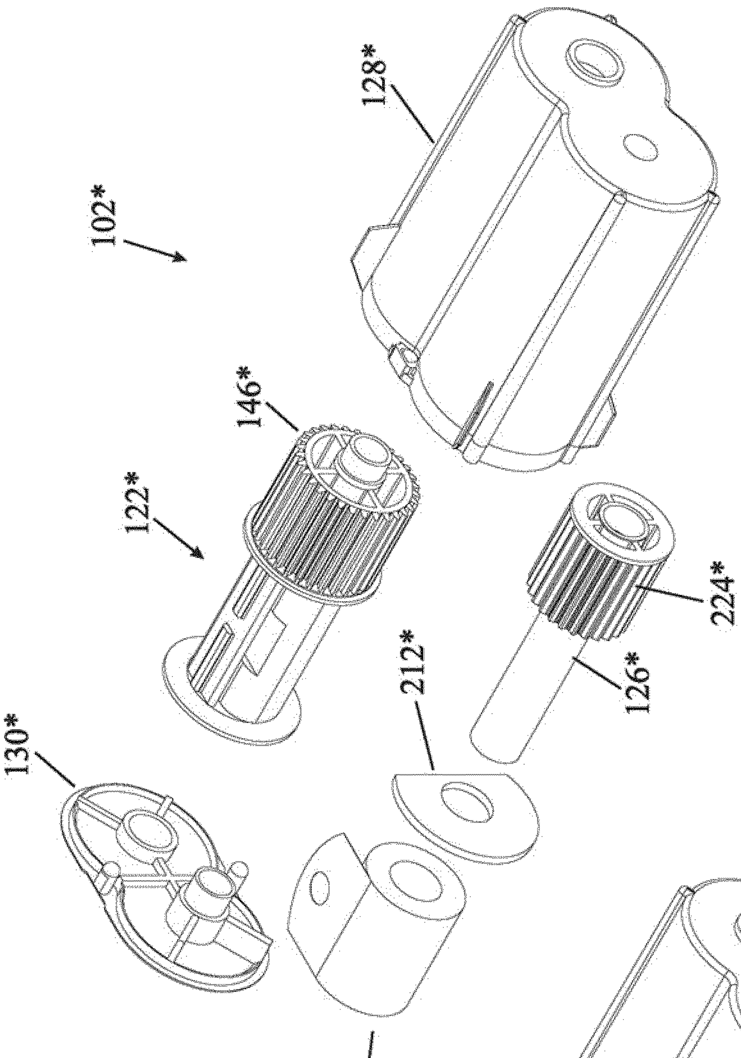
FIG. 29 is an exploded perspective view of the spring motor of FIG. 28.
Figure 28:
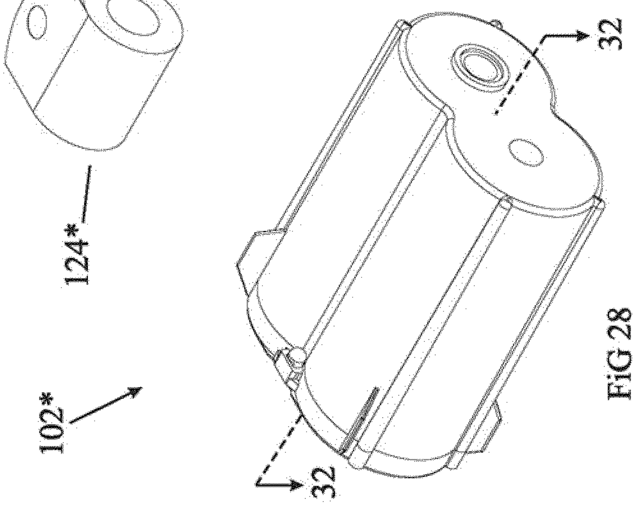
FIG. 28 a perspective view of another embodiment of a spring motor which may be utilized in the shade of FIG. 22.

The motor output spool 122' further includes an extension portion 146' extending axially to the right of the right shoulder 136'. In this embodiment the extension portion 146' is only a straight shaft, but in a later embodiment (See FIG. 29) the extension portion 146* includes geared teeth as described later. Stub shafts 148', 150' extend axially from each end of the motor output spool 122' for rotational support of the motor output spool 122' by the housing 128', as described later. As may also best be appreciated in FIG. 26, the output spool 122' has a hollow core defining a through-opening 214' with an internal profile which includes a "V" projection 216' to closely match the profile of one of the lift rods 1022', 1024' (which are identical to each other). As best appreciated in FIGS. 22 and 27, one of the lift rods goes through this opening 214' of the spring motor 102'B, for driving engagement between the lift rod 1022' and the output spool 122'. In FIG. 25, the lift rod going through the output spool 122' is labeled 1022', which is the case for the spring motor 102'B of FIGS. 21 and 22.

Figures 23, 24:
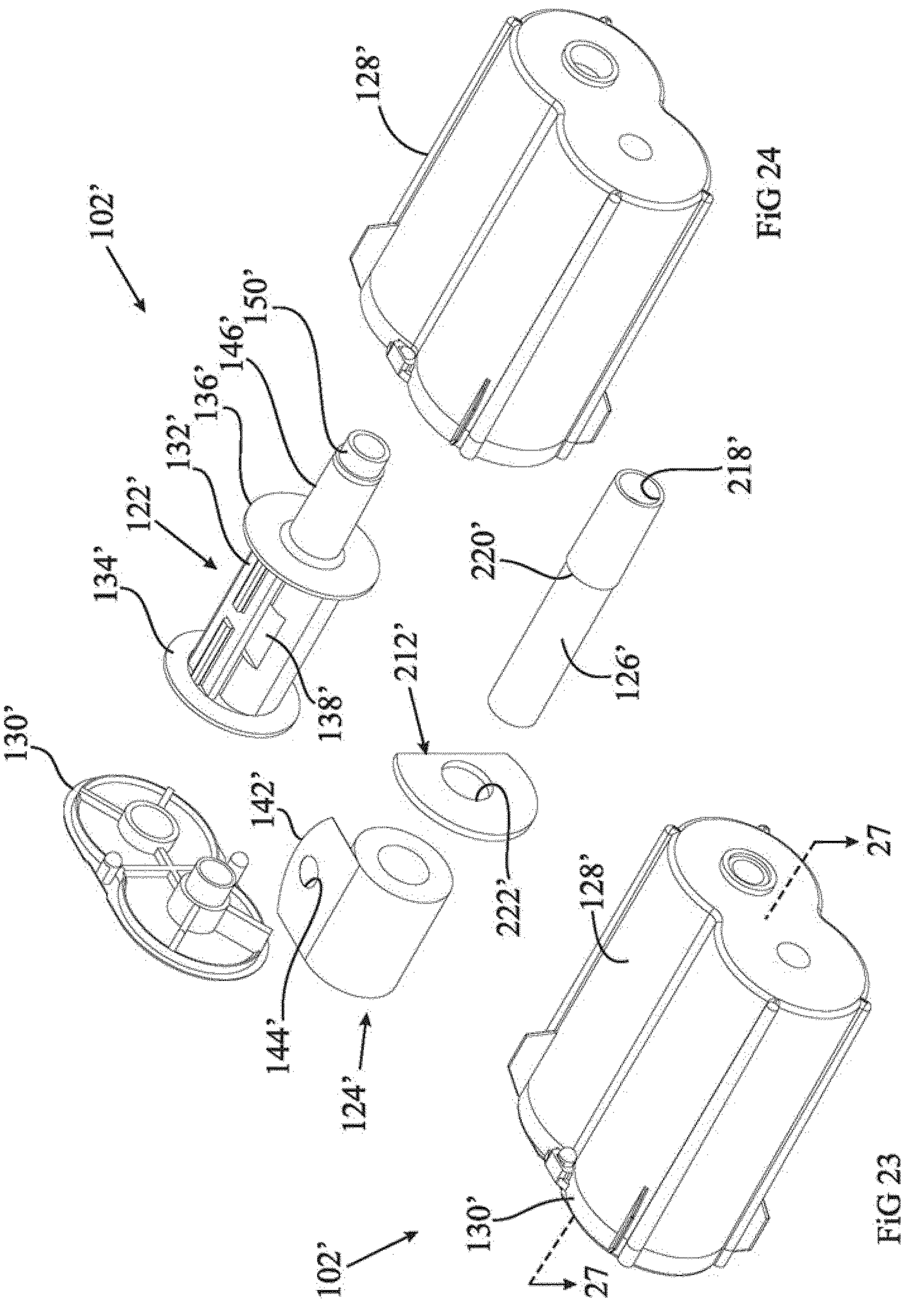
FIG. 23 a perspective view of one of the spring motors of FIG. 22.
FIG. 24 is an exploded perspective view of the spring motor of FIG. 23.

The flat spring 124' is a flat strip of metal which has been wound tightly upon itself, as has already been described with respect to an earlier embodiment (See FIG. 2). As discussed above, a first end 142' of the spring 124' defines a through opening 144' for releasably securing the flat spring 124' to the motor output spool 122'. The routing of the flat spring 124', as seen from the vantage point of FIG. 24, is for the first end 142' of the flat spring 124' to go into the flat 138' until the button 140' snaps into the through opening 144' of the flat spring 124'.

The storage spool 126' is a substantially cylindrical hollow element defining a through-opening 218' for pass-through accommodation of a lift rod, such as the lift rod 1024' as shown in FIGS. 22 and 25 (corresponding to the spring motor 102'B). The lift rod 1024' does not engage the storage spool 126', but rather goes through the storage spool 126' and may be rotationally supported by the storage spool 126'. Of course, another rod, such as a tilt rod for instance, may be routed to go through the opening 218' of the storage spool 126' instead of the lift rod 1024'. The storage spool 126' is rotatably supported by the housing 128', 130' of the spring motor 102' for rotation relative to the housing 128', 130'.

A support plate 212' defines a through-opening 222' to receive and rotatably support the storage spool 126' at a point intermediate the ends of the storage spool 126'. The storage spool 126' has a slightly larger diameter at a shoulder 220', which is larger than the diameter of the through opening 222' in the support plate 212', and which aids in locating the support plate 212' along the storage spool 126' during assembly by abutting the flat surface of the support plate 212'. The support plate 212' not only rotatably supports the storage spool 126' to limit flexing of the storage spool 126' during operation, but it also serves to provide a guide to the spring 124' as it comes off of the output spool 122' and onto the storage spool 126'.

Operation

The shade 1002' is assembled as disclosed above, with one of the spring motors 102'B mounted in the orientation shown in FIGS. 23, 25, and 27 (with the lift rod 1022' passing through and rotationally engaging the output spool 122', and the lift rod 1024' simply passing through the storage spool 126'). The other of the spring motors 102'M is mounted in an orientation which is flipped over 180 degrees end-over-end from that of the first spring motor 102'B (with the lift rod 1024' passing through and rotationally engaging the output spool 122', and the lift rod 1022' simply passing through the storage spool 126'). This pass-through arrangement of both the output spool 122' and the storage spool 126', with the output spools 122', being rotationally engaged by their respective lift rods, and with the storage spools 126' not rotationally engaging the lift rods that pass through them, allows for a very compact installation within the head rail 1004' of the shade 1002'. Not only can a large number of these components be mounted anywhere along the length of the head rail, since the rods can pass completely through them (that is, they do not necessarily need to be mounted at one of the ends of the head rail), but the lift rods can be placed in a parallel orientation very close to each other, allowing the use of a much narrower head rail than would otherwise be possible.

The lift rod 1022' for the bottom rail 1012' is routed through the output spool 122' of the spring motor 102'B, through the bottom lift stations 1020', through the bottom rail drop limiter 1025'B, and into the cord drive 1006'B. This bottom rail lift rod 1022' also goes through (but does not engage) the storage spool 126' of the spring motor 102'M. Likewise, the middle rail lift rod 1024' is routed through the Output spool 122' of the spring motor 102'M, through the middle lift stations 1018', through the middle rail drop limiter 1025'M, and into the cord drive 1006'M. This middle rail lift rod 1024' also goes through (but does not engage) the storage spool 126' of the spring motor 102'B.

To raise or lower either one of the rails, 1008', 1012', its corresponding cord drive 1006'B or 1006'M is operated by the user by pulling on one of the two legs of the respective drive cord 1007'. If the cord drive 1006'B on the far left side of the shade 1002' (as seen in FIG. 22) is operated by the user in the direction to lower the shade 1002', overcoming the brake mechanism in the cord drive 1006'B, then the bottom rail lift rod 1022' will rotate, causing rotation of the output spool 122' of the bottom rail spring motor 102'B in a clockwise direction (as seen from the vantage point of FIG. 24), which in turn causes the respective spring 124' to unwind from the output spool 122' and to wind onto the storage spool 126'. The spools on the bottom rail lift stations 1020' also rotate to lengthen the lift cables 1030' so as to lower the bottom rail 1012'. When the bottom rail 1012' reaches its full extension, the shoulder 208 on the rod 206 of the drop limiter 1025'B contacts the shoulder 210 on its respective base 204, which stops further rotation of the bottom rail lift rod 1022'. Reversing the direction in which the bottom rail cord drive 1006'B is operated also reverses the direction of rotation of the bottom rail lift rod 1022', resulting in the raising of the bottom rail 1012'

Actuation of the middle rail cord drive 1006'M at the right end of the shade 1002' results in a similar lowering or raising of the middle rail 1008', depending on the direction in which the drive cord 1007' of the cord drive 1006'M is pulled.

Drive Motor with a Pass-Through Feature for a Tilt Rod

Figure 22A:
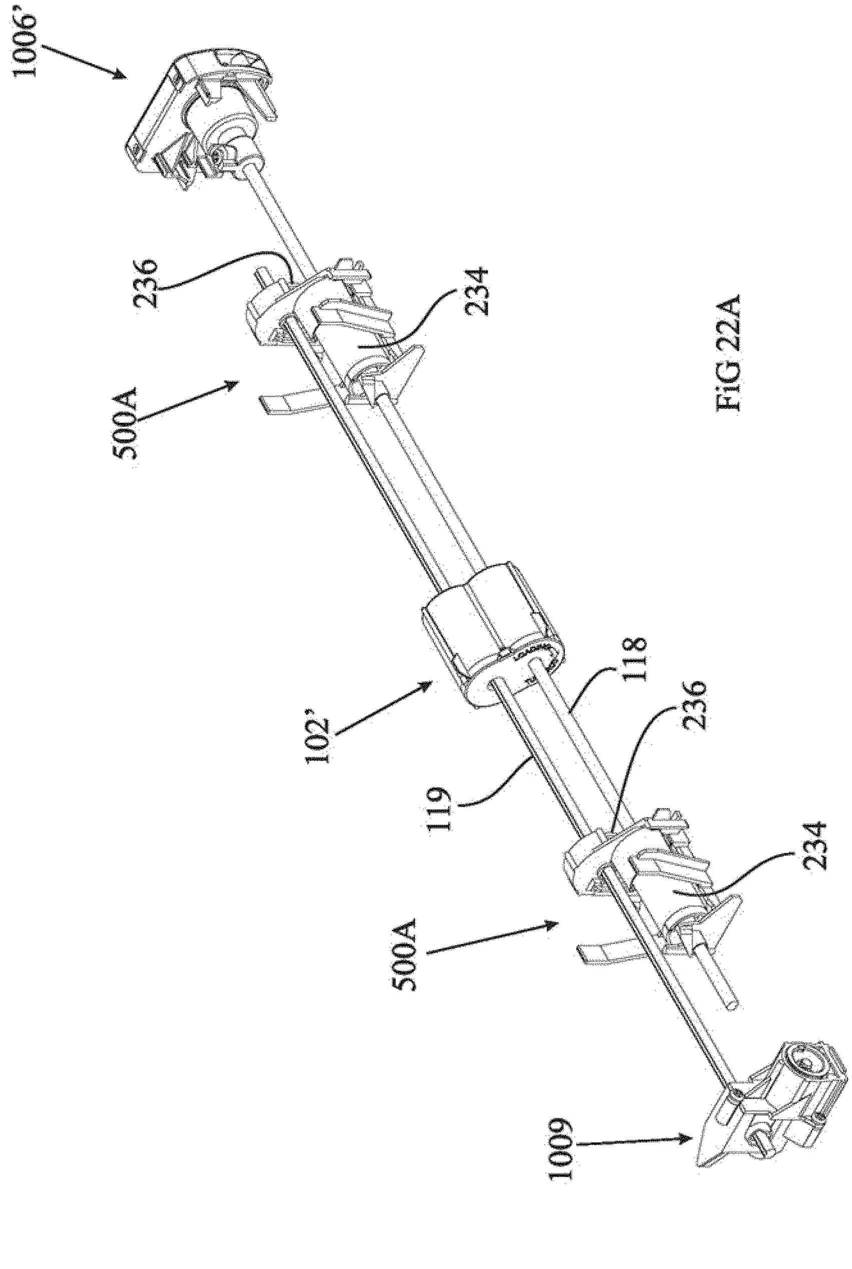
FIG. 22A is a perspective view of a drive for a blind, similar to the drive depicted in FIG. 22, but for a blind incorporating lift stations and tilt stations.

FIG. 22A depicts another application for the spring motor 102' described above, used in an application for a drive for a blind, wherein the blind includes lift and tilt stations 500A operatively connected via a lift rod 118 and a tilt rod 119, as described in more detail below.

The lift and tilt stations 500A are described in detail in U.S. Pat. No. 6,536,503 titled "Modular Transport Systems for Architectural Openings" issued Mar. 25, 2003, which is hereby incorporated by reference (refer specifically to item 500A in FIGS. 132, 133, 133A, 134, 1325, and 172). Very briefly, the lift and tilt station 500A includes a lift spool 234 onto which lift cords (not shown) wrap or unwrap to raise or lower the blind. This lift spool 234 is rotated along its longitudinal axis by the rotation of the lift rod 118. The lift and tilt station 500A also includes a tilt pulley 236 onto which tilt cables (not shown) wrap or unwrap to tilt the blinds from closed in one direction (say room side up), to open, to closed in the other direction (room side down). The tilt pulley 236 is rotated by the rotation of the tilt rod 119.

The cord tilter control module 1009 has been fully described in Canadian Patent No. 2,206,932 "Anderson", dated Dec. 4, 1997 (1997, Dec. 4), which is hereby incorporated by reference. Pulling on tilt cords (not shown) on the cord tilter module 1009 causes rotation of the tilt rod 119, which then also causes rotation of the tilt pulley 236 of the lift and tilt stations 500A, to wrap or unwrap the tilt cables (not shown) to tilt the blinds.

The output spool 122' of the spring motor 102' is operatively connected to the lift and tilt stations 500A via the lift rod 118. The tilt rod 119 passes through the storage spool 126' of the spring motor 102' but is not engaged by the spring motor 102'. This arrangement allows for the installation of a lift rod 118 and a tilt rod 119 in very close proximity to each other; that is, in a narrower head rail than would otherwise be possible.

Drive Motor with a Pass-Through Feature and an Integrally Mounted Transmission

All else being equal, the shade 1002' of FIG. 21 is limited in how long the cellular shade structure 1016' can be (or how far down the bottom rail 1012' can extend) by the number of turns the lift rod lift rod 1022' can rotate before the spring 124' of the spring motor 102' is fully unwound from the output spool 122'. FIGS. 28-32 depict another embodiment of a spring motor 102*, which is similar to the spring motor 102', except that it has an integral transmission to partially overcome this limitation. As discussed in more detail below, the gear ratio of the meshing gears in the output spool 122* and in the storage spool 126* of this spring motor 102* may be selected to result in the desired increase in number of turns of the lift rod, albeit at the expense of reduced torque.

Referring to FIGS. 28-32, the spring motor 102* is very similar to the spring motor 102' of FIGS. 23-27, including an output spool 122*, a flat spring 124*, a storage spool 126*, a motor housing 128*, a housing cover 130*, and a support plate 212*. The significant differences include a spur gear extension 146* on the output spool 122* to replace what was a straight shaft extension 146', and a meshing spur gear extension 224* on the storage spool 126* to the right of what was the shoulder 220' of the spring motor 102'.

Figure 31:
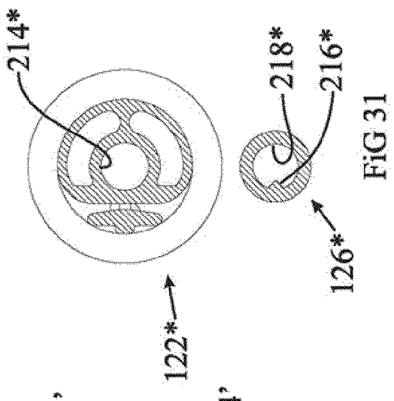
FIG. 31 is a section view along line 31-31 of FIG. 30, with the lift rods removed for clarity.
Figure 30:
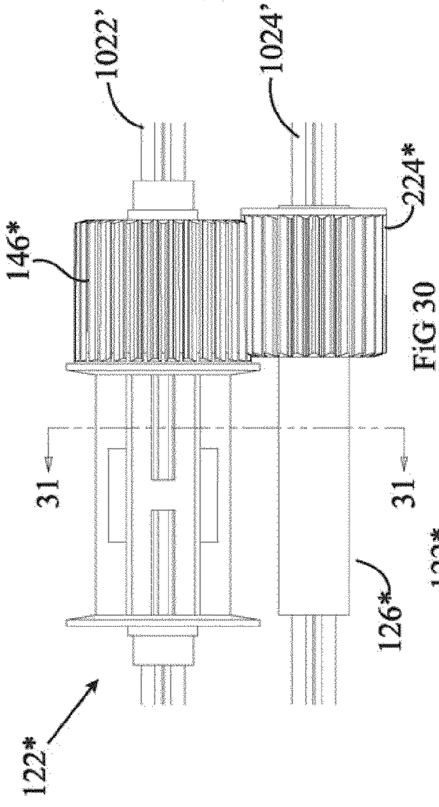
FIG. 30 is a plan view of the spring motor of FIG. 28, with the housing and spring removed for clarity, and incorporating the two lift rods of FIG. 22.
Figure 32:
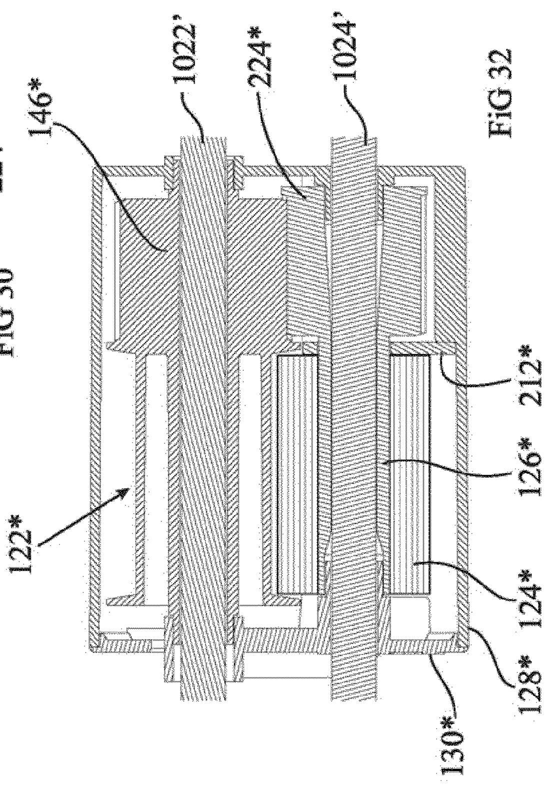
FIG. 32 is a section view along line 32-32 of FIG. 28, and incorporating the two lift rods of FIG. 22.

Referring now to FIG. 31 and comparing it with FIG. 26 of the previous embodiment, it should be noted that the hollow core 214* now has a round internal profile, without the "V" projection which had been used to engage the lift rod 1022'. Therefore, the output spool 122* now becomes a pass-through only spool which does not rotatably engage the lift rod extending through it. On the other hand, the hollow core 218* of the storage spool 126* now has an internal profile which includes a "V" projection 216* to rotatably engage the lift rod 1024' passing through this storage spool 126*.

With this arrangement, the spur gear extension 146* rotates with the output spool 122*, and it drives the storage spool gear 224*, which, in turn, drives the lift rod 1024' that is extending through the storage spool 124*. The lift rod 1022' extending through the drive spool 122* is just a pass-through, and is not driven by the spring motor 102*.

The installation of this spring motor 102' is very similar to that of the spring motor 102' of FIG. 22, except that one lift rod is now passing through and rotatably engaging the storage spool 126*, while the other lift rod is only passing through the output spool 122*. Therefore, where the bottom rail spring motor 102'B was located, one would now install the middle rail spring motor 102*M because this spring motor 102*M would now be engaging the middle rail lift rod 1024' via its storage spool 126*. Likewise, where the middle rail spring motor 102'M was located, one would now install the bottom rail spring motor 102*B because this spring motor 102*B would now be engaging the bottom rail lift rod 1022' via its storage spool 126*.

The gear ratio of the spur gear 146*(on the output spool 122*) and the spur gear 224*(on the storage spool 126*) may be selected to provide additional turns of the storage spool 126*(and therefore of the lift rod which is rotationally engaged by the storage spool 126*) to extend the length of the shade which may be handled by the spring motor 102* as compared to an otherwise identically sized spring motor 102'.

Drive Motor for Simultaneous Lift/Tilt Action

Figure 36:
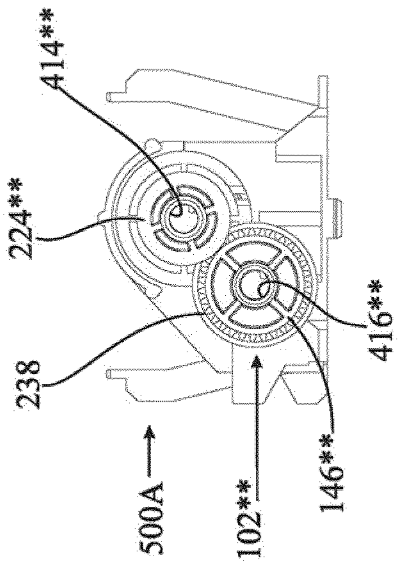
FIG. 36 is a view along line 36-36 of FIG. 35.
Figure 35:
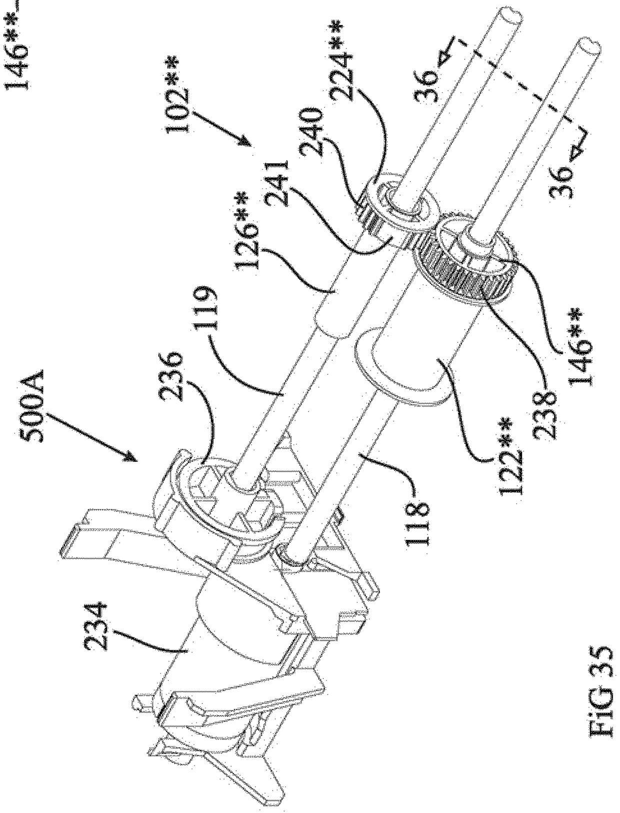
FIG. 35 is a perspective view of another embodiment of a spring motor in combination with a lift and tilt station, with the flat spring and the motor housing omitted for clarity.
Figure 37:
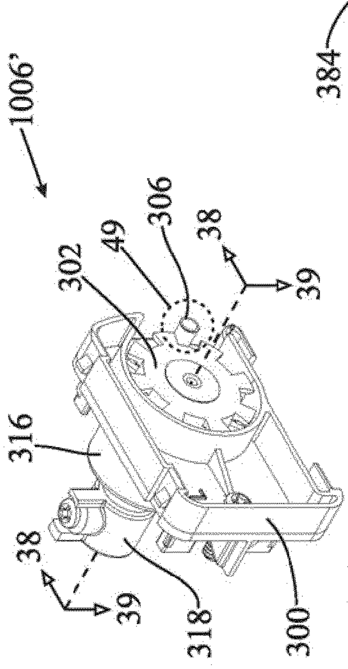
FIG. 37 is a perspective view of the cord drive of FIG. 22, with the housing cover omitted for clarity.

FIGS. 35 and 36 depict another embodiment of a spring motor 102** (in these views the housing and the flat spring are omitted for clarity) used in an application wherein the raising and lowering action of the covering (such as a blind or shade) is also used to tilt the slats open or closed, as discussed in more detail below.

The spring motor 102 is operatively connected to a lift and tilt station 500A via a lift rod 118 and a tilt rod 119. The lift and tilt station 500A is described in detail in U.S. Pat. No. 6,536,503 titled "Modular Transport Systems for Architectural Openings" issued Mar. 25, 2003, which is hereby incorporated by reference (refer specifically to item 500A in FIGS. 132, 133, 133A, 134, 1325, and 172). Very briefly, the lift and tilt station 500A includes a lift spool 234 onto which lift cords (not shown) wrap or unwrap to raise or lower the shade. This lift spool 234 is rotated about its longitudinal axis by the rotation of the lift rod 118. The lift and tilt station 500A also includes a tilt pulley 236 onto which tilt cables (not shown) wrap or unwrap to tilt the blinds from closed in one direction (say room side up), to open, to closed in the other direction (room side down). The tilt pulley 236 is rotated by the rotation of the tilt rod 119**.

The spring motor 102 includes a drive gear 146** mounted for rotation with the output spool 122**, and a driven gear 224** mounted for rotation with the storage spool 126**. As best appreciated in FIG. 35, the drive gear 146** includes a full set of geared teeth 238 on its circumference. On the other hand, the driven gear 224** includes geared teeth 240 on most of its circumference, with a portion 241** of the circumference having no gear teeth.

As may be best appreciated in FIG. 36, both the storage spool 126 and the output spool 122** have hollow inner cores 414**, 416** respectively, which define non-cylindrical profiles in order to rotationally drive their corresponding rods 119, 118**.

Operation of the Drive Motor for Simultaneous Lift/Tilt Action

When a window blind incorporating the spring motor 102 and lift and tilt stations 500A is operated by the user (for instance to lower the blind by pulling on the drive cord 1007' (See FIG. 21) of a cord drive mechanism 1006'), the lift rod 118 will rotate, which also rotates the output spool 122**, the drive gear 146**, and the lift spool 234 of the lift and tilt station 500A. The lift cords (not shown) unwrap from the lift spool 234, lowering the blind. The drive gear 146** also drives the driven gear 224** as long as the geared teeth 238 of the drive gear 146** are engaging the geared teeth 240 of the driven gear 224**, resulting in rotation of the tilt pulley 236 of the lift and tilt station 500**A, which causes the blind slats to tilt closed in one direction (say room side up).

When the blind is closed in this room side up direction the driven gear 224 will have rotated far enough to present its toothless portion 241 of the driven gear 224** to the drive gear 146**, such that further rotation of the drive gear 146** results in no further rotation of the driven gear 224** and therefore also no further rotation of the tilt pulley 236** and no further closing of the blind, even though the blind continues to be lowered by the user.

Once the user has lowered the blind to the desired location he may reverse the action and raise the blind slightly. This reverses the direction of rotation of the drive gear 146 which then brings the geared teeth portion 240 of the driven gear 224** back into meshed engagement with the drive gear 146**, causing the driven gear 224** to rotate together with the tilt pulley 236**, resulting in tilting the slats into the open position. The user may release the blind when the desired degree of tilting of the blind is reached.

Of course, if the blind is not raised at all after lowering, the blind will remain tilted closed (room side up in this example). Further raising of the blind results in further tilting of the blind through the open position, until the blind reaches a closed position in the opposite direction (room side down in this example). At this point, the driven gear 224 will once again have rotated far enough to present its toothless portion 241 to the drive gear 146** such that further rotation of the drive gear 146** results in no further rotation of the driven gear 224** and therefore also no further rotation of the tilt pulley 236** and no further tilting closed of the blind, even though the blind continues to be raised by the user.

Cord Drive with Clutch Mechanism

The cord drive with clutch mechanisms 1006'B and 1006'M of FIGS. 21 and 22 are identical to each other and are depicted generically as 1006' in FIGS. 37-40. As indicated earlier, this cord drive 1006' may be used to raise or lower a blind or shade (or other window covering). It may also be used to tilt open or closed a window covering either by directly actuating a tilt rod connected to a tilt station or by doing so indirectly via a lift rod, as is described in the above embodiment of a drive motor for simultaneous lift/tilt action. This cord drive 1006' also incorporates a clutch mechanism (also referred to as a brake mechanism) to ensure that only the input shaft may drive the output shaft (and do so in either direction of rotation), but the output shaft may not back drive the input shaft, as described below. Therefore, once the covering is extended or retracted (or tilted open or closed) to the desired location by the user and released, the covering remains in that location regardless of the weight of the covering and regardless of whether the mechanism assisting the operation of the covering is underpowered (which would otherwise allow the weight of the covering to extend the covering) or overpowered (which would otherwise allow the covering to creep upward).

Figure 40:
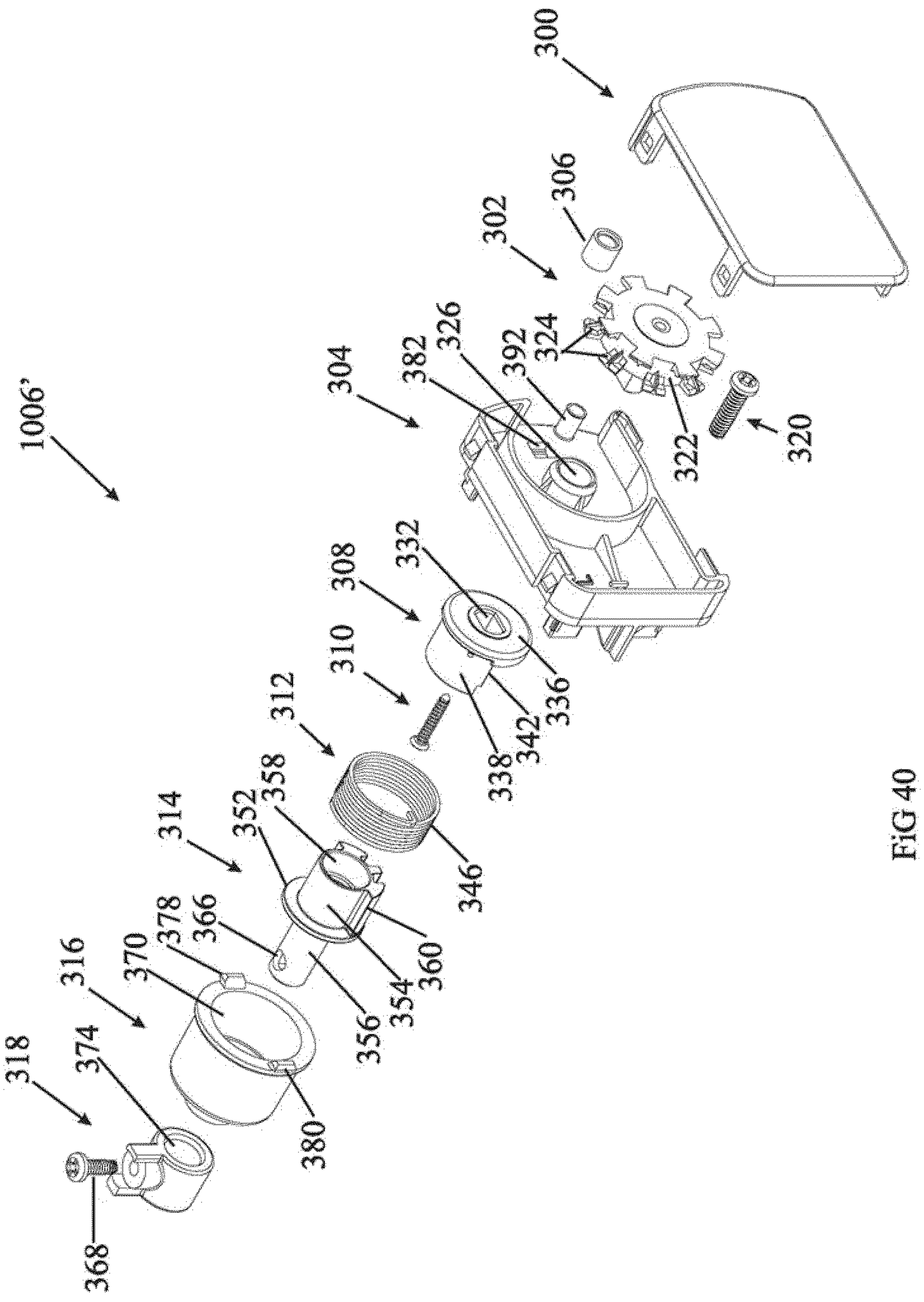
FIG. 40 is a partially exploded, perspective view of the cord drive of FIG. 37, including the housing cover.

Referring to FIG. 40, the cord drive with clutch mechanism 1006' includes a housing cover 300, a sprocket 302, a housing 304, a roller 306, an input shaft 308 (also referred to as an actuator side shaft 308), an assembly screw 310, a spring 312, an output shaft 314 (also referred to as a load side shaft 314), a brake housing 316, a collet 318 (or coupling device 318 to secure a rod, such as the lift rod 1024' in FIG. 22, to the output shaft 314), and a runnerless screw 320 to secure the housing 304 to a rail, such as the head rail 1004'.

Referring to FIGS. 38, 39, 40, and 42, the sprocket 302 includes a pulley 322 defining a plurality of circumferentially-placed, staggered, and alternating wedges 324 which both guide and releasably engage the drive cord 1007' (See FIG. 22) such that pulling on one leg of the drive cord 1007' rotates the sprocket 302 relative to a bearing support 326 (See FIG. 40) in the housing 304 in a first direction, and pulling on the other leg of the drive cord 1007' rotates the sprocket 302 in the opposite direction.

The sprocket 302 also defines an axially extending shaft with a first, proximal shaft portion 328 with a circular cross-section for rotation on the bearing support 326 of the housing 304, and a second, distal shaft portion 330 with a non-circular cross-section which matches a similarly profiled cavity 332 (See FIG. 40) in the input shaft 308. When assembled, the distal shaft portion 330 of the sprocket 302 is received in the cavity 332 of the input shaft 308, such that rotation of the sprocket 302 results in rotation of the input shaft 308.

Figure 38:
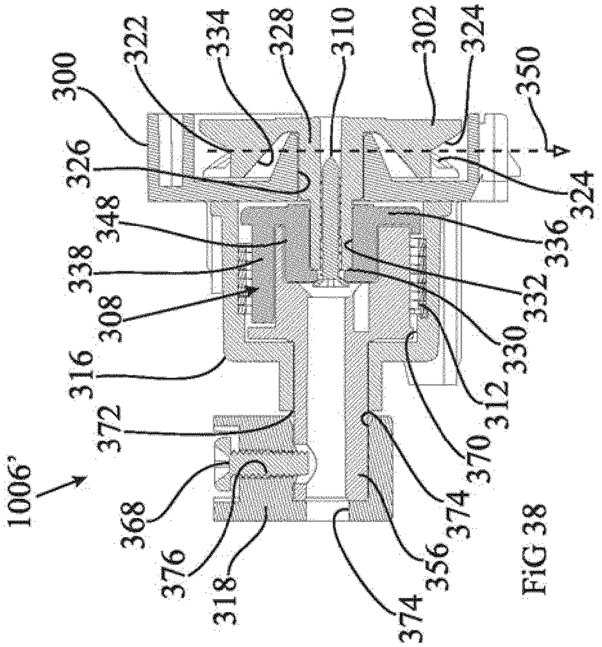
FIG. 38 is a section view along line 38-38 of FIG. 37.

Due to a recessed inner hub 334 of the sprocket 302, the proximal shaft portion 328 of the sprocket 302 is directly in line with the drive cord 1007' (the dotted arrow 350 in FIG. 38, which represents where the drive cord 1007' rides on the sprocket 302, shows how the drive cord 1007' is directly in line with the proximal shaft portion 328). Therefore, when the operator pulls on the drive cord 1007', the sprocket 302 is supported immediately under the cord, not cantilevered out. This means that there is no lever arm to place a bending moment on the sprocket shaft 328.

The distal shaft portion 330 of the sprocket 302 is received in a cavity 332 of the input shaft 308 which allows for the sprocket 302 to have a smaller journal than that found in prior art designs wherein the input shaft 308 fits into a cavity in the sprocket shaft. This “smaller journal” feature results in a more efficient design with smoother operation because the smaller surface area results in lower friction of rotation, and the smaller diameter results in a larger lever arm between the drive cord 1007' and the sprocket’s shaft 330, which makes the covering easier to lift.

Figure 47:
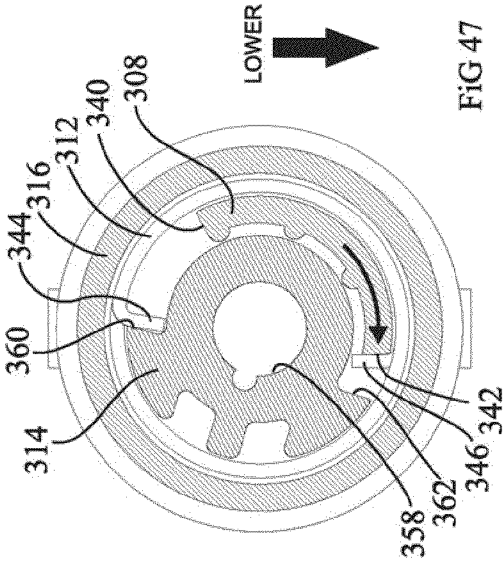
FIG. 47 is a section view, similar to that of FIG. 46, but with the drag brake in one of its unlocked positions.
Figure 48:
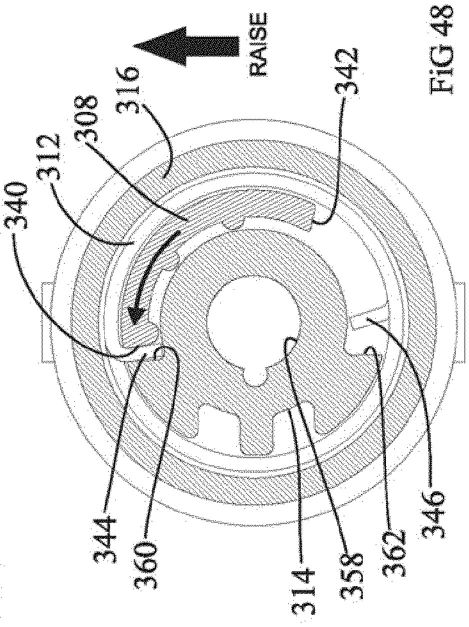
FIG. 48 is a section view, similar to that of FIG. 47, but with the drag brake in the other of its unlocked positions.
Figure 46:
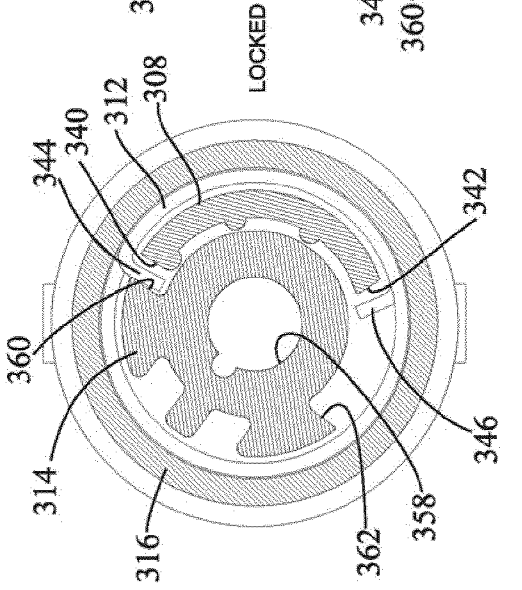
FIG. 46 is a section view along line 46-46 of FIG. 39, with the drag brake in the locked position.

Referring to FIGS. 38, 39, 40, and 43, the input shaft 308 includes a radially extending flange 336 with a circular hub 348 which, as described earlier, defines the non-circular cross-section cavity 332 that receives the distal shaft portion 330 of the sprocket 302. It also includes an arc-segment wall 338 extending axially from the circumference of the flange 336. This arc-segment wall 338 defines two shoulders 340, 342 which, when rotated, alternately contact inwardly-projecting ends 344, 346 of the spring 312, respectively (See also FIGS. 46-48), to collapse the coil of the spring 312 and release the braking force when the drive cord 1007' is pulled, as explained in more detail later. The circular hub 348 of the input shaft 308 also is received inside of and provides a bearing surface for the rotational support of the output shaft 314, as also described in more detail later.

Referring to FIGS. 38, 39, 40, and 46-48, the coil spring 312 has a first end 344 and a second end 346, both of which project inwardly from the coil. The spring 312 defines an “at rest” coil outside diameter when no outside forces are acting on the spring 312, and this coil outside diameter collapses (becomes smaller) when a force acts on one or both of the ends 344, 346 in a direction to tighten (or wind up) the coil. Likewise, the coil expands (becomes larger) when a force acts on one or both of the ends 344, 346 in the opposite direction, that is, in the direction so as to unwind the coil. When assembled, the shoulders 340, 342 of the input shaft 308 lie adjacent to the ends 344, 346 (See FIG. 46) of the spring 312, such that rotation of the input shaft 308 brings one of the shoulders 340, 342 against its corresponding spring end 344, 346 in a direction to collapse the spring 312.

Referring to FIGS. 38, 39, 40, and 44, the output shaft 314 includes a radially extending flange 352 which defines a first hub 354 projecting in the "actuator side" direction, and a second hub 356 projecting in the "load side" direction. The first hub 354 defines a circularly-profiled inner cavity 358 which receives and is supported for rotation on the circular hub 348 of the input shaft 308. This first hub 354 further defines first and second shoulders 360, 362 are adjacent to the inwardly-projecting ends 344, 346 of the spring 312, respectively (See also FIGS. 46-48). When assembled, the shoulders 360, 362 of the output shaft 314 are arranged such that when one or the other shoulder 360, 362 of the output shaft 314 presses against one of the ends 344, 346 of the spring 312, it acts to expand the spring 312.

Figure 44:
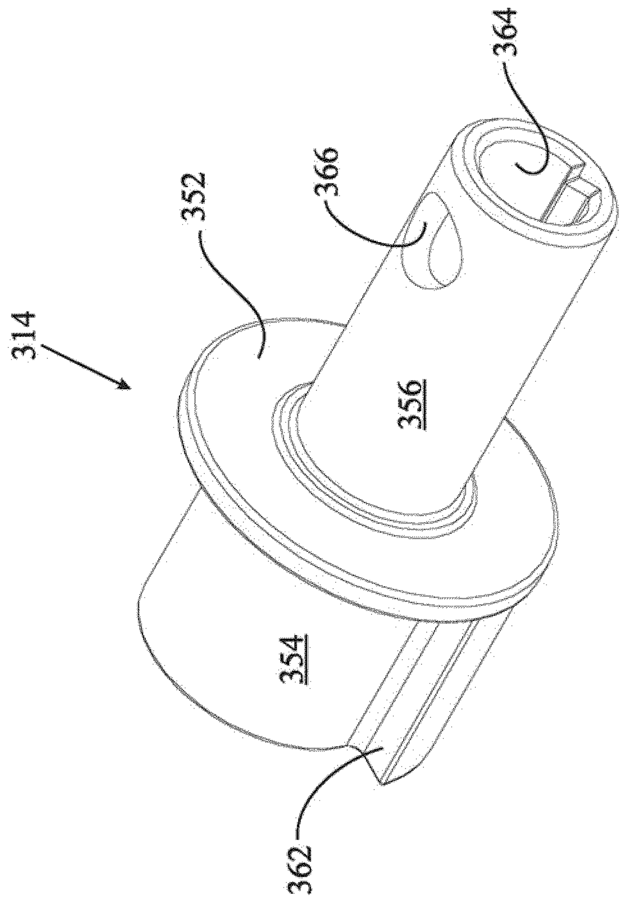
FIG. 44 is an opposite-end perspective view of the output shaft of FIG. 40.
Figure 45:
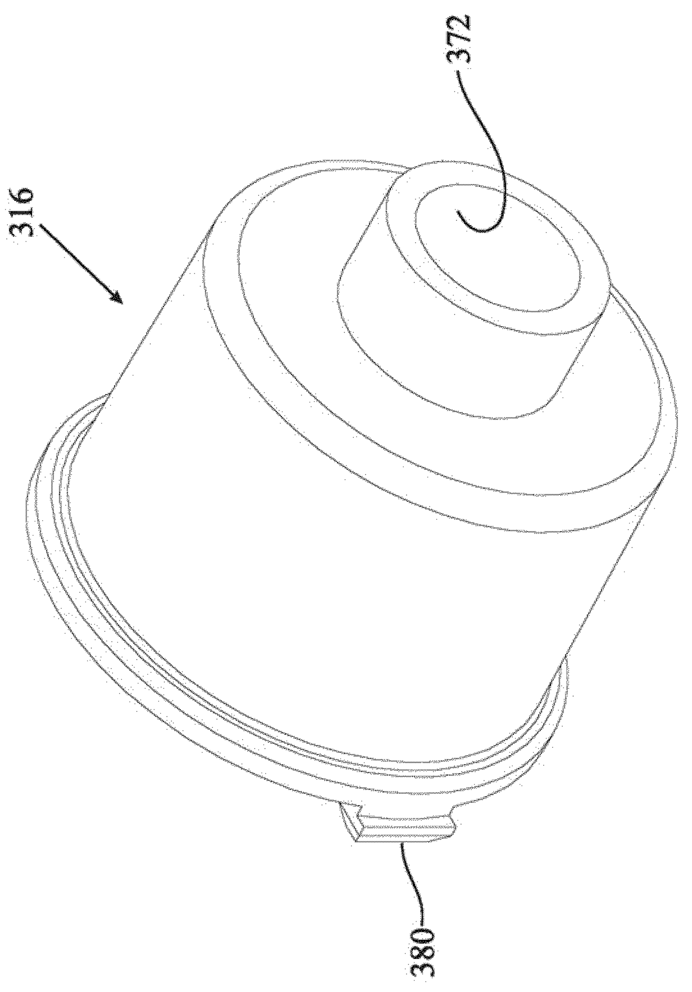
FIG. 45 is an opposite-end perspective view of the clutch housing of FIG. 40.

Referring to FIG. 44, the second hub 356 has a non-circularly profiled cavity 364 (with a V-shaped projection) for receiving the similarly profiled lift rod 1022' or 1024 such that rotation of the output shaft 314 results in rotation of the lift rod that extends into the second hub 356. The second hub 356 also defines a radially directed opening 366 to receive a collet screw 368 (See FIG. 40) for ensuring a tight connection between the output shaft 314 and its corresponding lift rod.

Referring to FIGS. 38, 39, 40, and 45, the clutch housing 316 is a substantially hollow cylinder with a large opening at one end defining a circularly-profiled cavity 370 with an inside diameter which is just slightly smaller than the at-rest outside diameter of the coil of the spring 312. The other end of the clutch housing 316 has a smaller opening 372 which receives and provides rotational support to the second hub 356 of the output shaft 314. The clutch housing 316 also defines two tabs 378, 380 (See also FIG. 39) which engage rectangular openings 382 (See also FIG. 41) in the housing 304 to snap these two parts 316, 304 together and fix the clutch housing 316 to the housing 304. Since the housing 304 is fixed to the headrail, both the housing 304 and the clutch housing 316 are stationary relative to the headrail.

Figure 39:
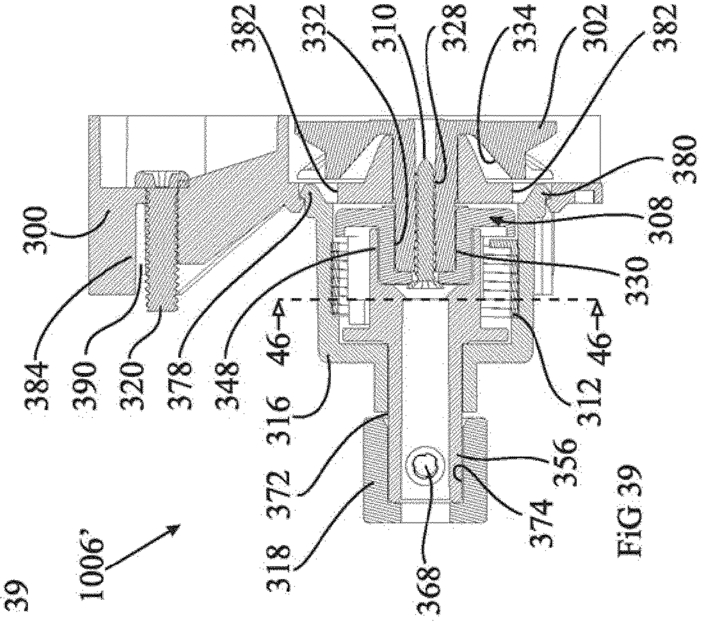
FIG. 39 is a section view along line 39-39 of FIG. 37.

Referring to FIGS. 38, 39, and 40, the collet 318 is a substantially "U"-shaped hollow cylinder with a through opening 374 that is axially-aligned with the opening 372 in the housing 316 to receive a rod (such as a lift rod). Part of the opening 374 has a slightly larger inside diameter, allowing it to slip over the second hub 356 of the output shaft 314, and the end portion of the opening 374 has a smaller inside diameter, sl it abuts the end of the second hub 356 of the output shaft 314. The collet 318 defines a radially-directed, threaded portion 376 which receives the collet screw 368. As described earlier, when assembled, the collet screw 368 projects through the radially-directed opening 366 in the output shaft 314 to secure the collet 318 to the output shaft 314, and to press against the rod to more securely connect the rod to the cord drive 1006'.

Figure 41:
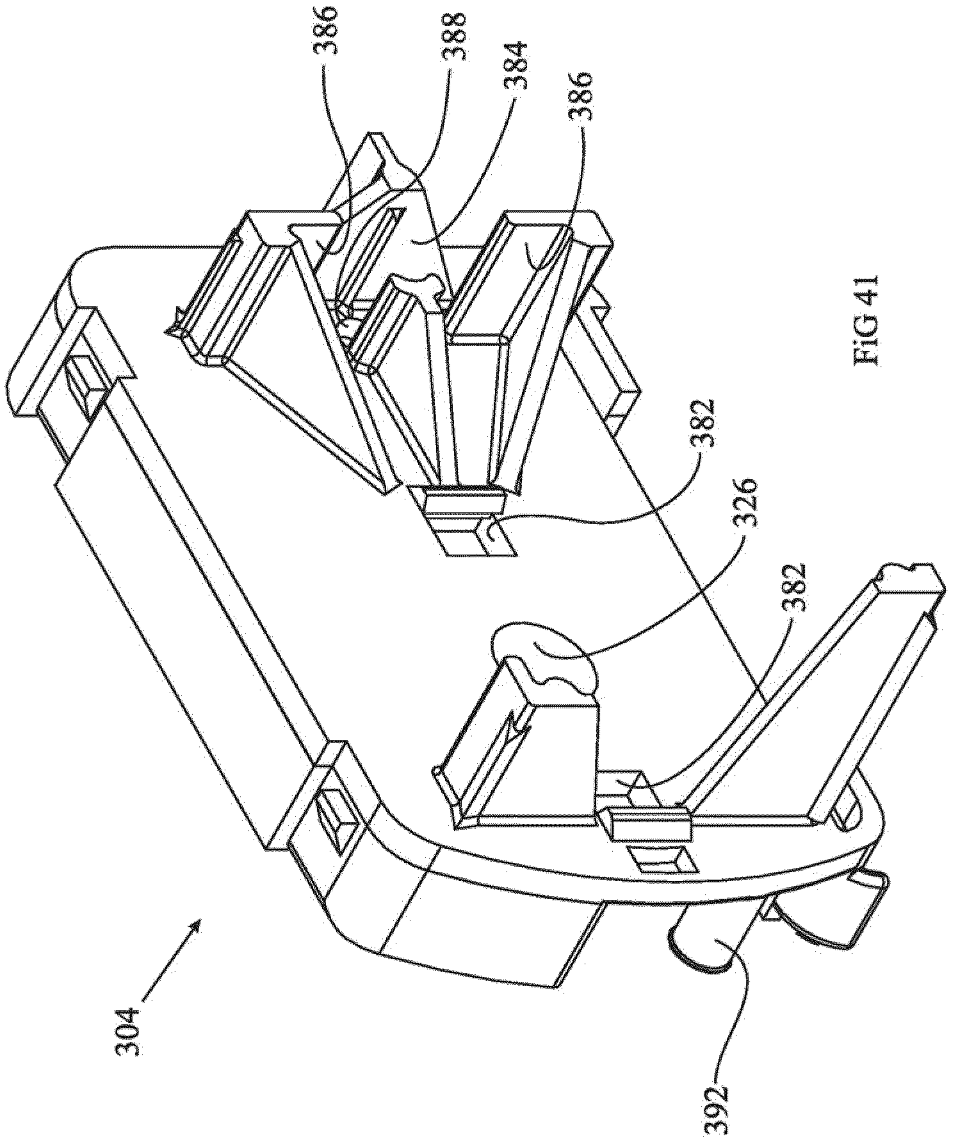
FIG. 41 is an opposite-end perspective view of the housing of FIG. 40.
Figure 42:
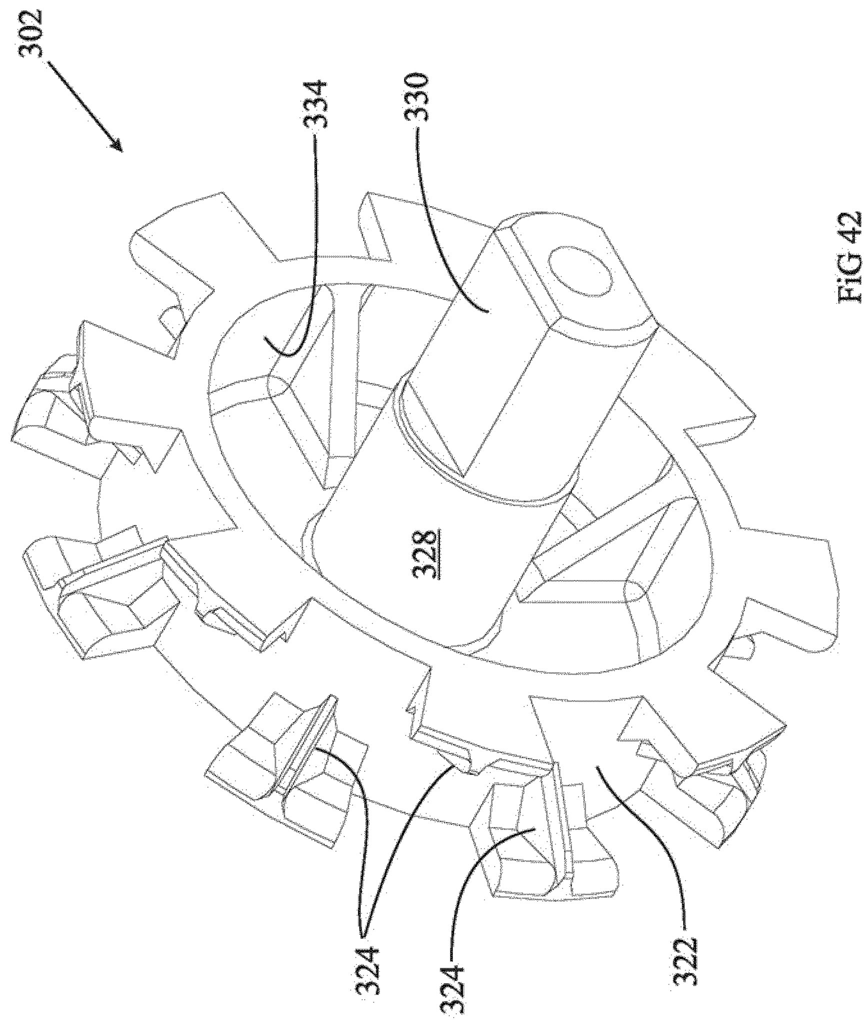
FIG. 42 is an opposite-end perspective view of the sprocket of FIG. 40.
Figure 43:
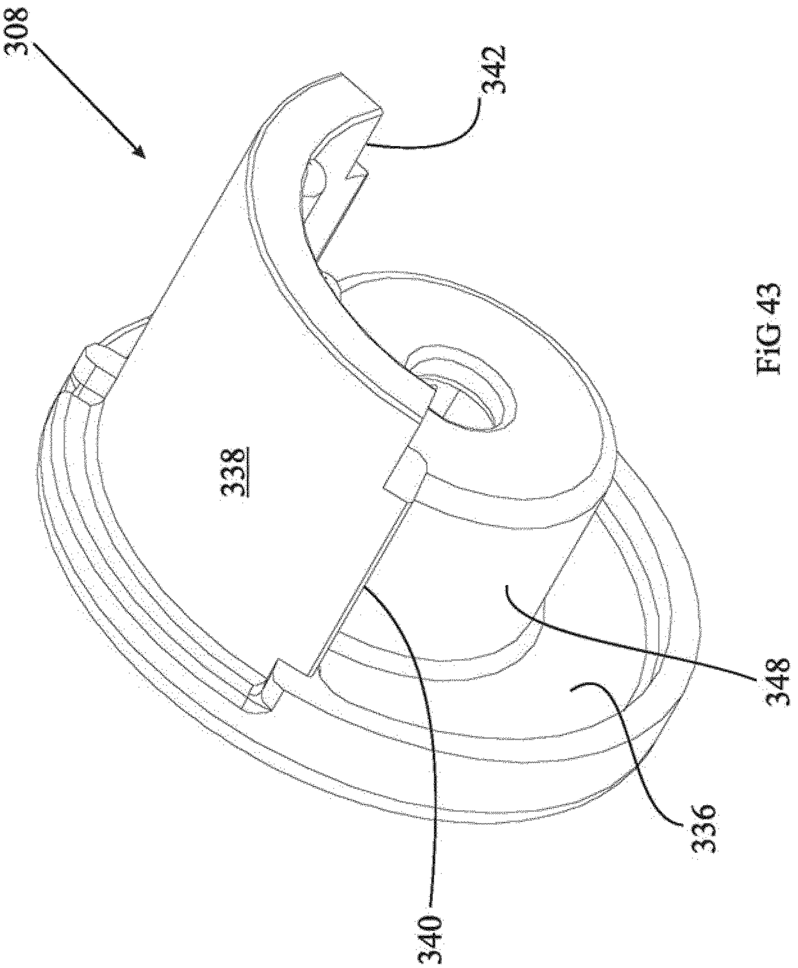
FIG. 43 is an opposite-end perspective view of the input shaft of FIG. 40.

Referring to FIGS. 39, 40, and 41, the housing 304 also defines webs 384, 386 to effectively trap a leg of an extrusion, such as of the extrusion which forms the head rail 1004'. The runnerless screw 320 is then threaded through an opening 388 in the housing (See FIG. 41). This screw 320 "bites" into the side of the leg of the extrusion, which is trapped in the slit opening 390 of FIG. 39 and unable to move away because of the backing provided by the web 384, to secure the housing 304 (and therefore the cord drive 1006') to the head rail 1004'.

Referring to FIGS. 40 and 49-52 the roller 306 is rotatably supported on a substantially cylindrical projection 392 on the housing 304. The projection 392 defines a very slight flange or lip 394 (See FIG. 52) at its distal end to releasably "capture" the roller 306 once it has been assembled onto the projection 392. The roller 306 is counterbored at both ends 396, 398 (See FIG. 50) which eases assembly of the roller 306 to the projection 392 and prevents binding of the roller 306 on the radiused corner 400 of the projection 392 at the housing 304.

Assembly and Operation of the Cord Drive

Most of the assembly of the cord drive 1006' has already been discussed in the above description of the components. Very briefly, and referring to FIGS. 40 and 46-48, the drive cord is first attached to the sprocket 302 by weaving the drive cord onto the pulley 322 and between the alternating wedges 324 of the sprocket 302. The roller 306 may be mounted onto the projection 392 of the housing 302 at any time. The sprocket 302 is then mounted to the housing 304, with the proximal shaft portion 328 rotatably supported on the bearing support 326. The cord is routed over the roller 306 so the roller 306 guides and supports the cord onto the sprocket 302. The input shaft 308 is mounted to the distal shaft portion 330 of the sprocket 302, as has already been described, and the assembly screw 310 is used to secure the input shaft 308 to the sprocket 302, as shown in FIGS. 38 and 39. The spring 312 is mounted over the hub 348 and over the wall 338 of the input shaft 308 such that the shoulders 340, 342 of the wall 338 are adjacent to the ends 344, 346 of the spring 312 (See FIG. 46) and such that, if the input shaft 308 rotates, one of the shoulders 340, 342 contacts one of the ends 344, 346 of the spring 312 so as to collapse the spring 312 to effectively reduce the inside and outside diameters of the spring 312.

The output shaft 314 is next assembled so its inner cavity 358 is rotatably supported on the hub 348 of the input shaft 308 and such that the shoulders 360, 362 lie adjacent to the ends 344, 346 of the spring 312 (See FIG. 46) and such that, if the output shaft 314 rotates, one of the shoulders 360, 362 contacts one of the ends 344, 346 of the spring 312 so as to expand the spring 312 to effectively increase the inside and outside diameters of the coil.

The clutch housing 316 is mounted such that the spring 312 is in the cavity 370 (it may be necessary to rotate the sprocket 302 which also rotates the input shaft 308 so as to collapse the spring 312 in order to fit the clutch housing 316 over the spring 312). The tabs 378, 380 of the clutch housing 316 are snapped into the openings 382 in the housing 304, and the collet 318 is mounted onto the second hub 356 of the output shaft 314, with the collet screw 368 projecting through the opening 366 in the second hub 356 of the output shaft 314.

The tabs 378, 380 which attach the clutch housing 316 to the housing 304 prevent relative motion between the clutch housing 316 and the housing 304. If the housing 304 is secured to the head rail (as discussed below) and the clutch housing 316 is secured to the housing 304 (as discussed above) then the clutch housing 316 is effectively secured to the head rail, with no relative motion allowed between these three parts (the housing 304, the clutch housing 316, and the head rail 1004').

To mount the cord drive 1006' to a window covering, the housing 304 is placed at one end of the head rail 1004' (See FIG. 21) with a leg of the extrusion of the head rail 1004' captured in the slit opening 390 (See FIG. 39) of the housing 304. The runnerless screw 320 is then screwed through the opening 326 in the housing 304 and along the side of the extrusion leg so it may "bite" onto the side of the extrusion leg to secure the cord drive 1006' to the head rail 1004'. The housing cover 300 may then be snapped over the housing 302 to finish off the assembly. When the other components are installed onto the head rail 1004', the lift rod may be connected to the second hub 356 of the output shaft 314, and the collet screw 368 may then be screwed further through the opening 366 to press the lift rod against the cavity 364 output shaft 314 for a more secure connection.

The operation of the cord drive 1006' is now described. Pulling on one leg of the drive cord 1007' causes the sprocket 302 to rotate in a first direction which also rotates the input shaft 308 such that one of the shoulders 340, 342 contacts one of the ends 344, 346 of the spring 312 to collapse the spring 312 to effectively reduce the inside and outside diameters of the spring 312. This allows the spring 312 to slip relative to the cavity 370 of the clutch housing 316, and both the input shaft 308 and spring 312 rotate until one of the ends 344, 346 of the spring 312 contacts one of the shoulders 360, 362 of the output shaft 314. Now all three components (the input shaft 308, the spring 312, and the output shaft 314) rotate as a unit, and so does the rod connected to the end of the output shaft 314. Any component or load connected to the rod (such as a spring motor 102', or a lift station 1020' in FIG. 22) will also rotate. In the example in FIG. 22, the middle rail 1008' or the bottom rail 1012' may be raised or lowered depending on which cord drive 1006' is actuated and which leg of the drive cord 1007' is pulled.

Preferably, pulling on the upper leg of the drive cord loop (as seen from the reference point of FIG. 22) results in raising of the shade as this is the more demanding of the two tasks (raising or lowering of the shade) but this is also the easiest (path of least resistance) routing of the cord drive 1007' through the cord drive 1006'.

As may be appreciated from the above description, no matter which leg of the drive cord 1007' is pulled by the user, the cord drive 1006' will rotate the sprocket 302, the input shaft 308, the output shaft 314, and the rod (if connected to the output shaft 314); in one instance rotating them in a first direction, and in the other instance rotating them in a second direction.

When the user releases the drive cord 1007', the shoulders 340, 342 of the input shaft 308 will no longer be pushing against the ends 344, 346 of the spring 312. The spring 312 returns to its at-rest dimension, expanding until it presses against the inside surface of the cavity 370 of the clutch housing 316. This locks the spring 312 against rotation in the cavity 370 of the clutch housing 316. If a component or load connected to the rod attempts to back drive the rod (for instance, if gravity acts to pull down on the shade), the rod starts rotating and rotates the output shaft 314. This happens for only a very few degrees of rotation, until one of the shoulders 360, 362 of the output shaft 314 contacts one of the ends 344, 346 of the spring 312 so as to expand the spring 312 to increase the diameter of the coil. This further presses the spring 312 against the inner surface of the cavity 370 of the clutch housing 316, causing the spring 312 to lock tightly onto the clutch housing 316, which also prevents further rotation of the output shaft 314 (and the rod that is received in and fixed to the output shaft 314), therefore also locking the shade in place.

Alternate Embodiment of the Cord Drive with Clutch Mechanism

FIGS. 53-56 depict an alternate embodiment of a cord drive 1006*. A visual comparison of FIGS. 40 and 56 points out two major differences: the absence of an assembly screw 310 and the absence of a collet screw 368. A third difference, not immediately obvious, concerns the projection 392* for rotational support of the roller 306*. These differences are explained in more detail below.

Figure 55:
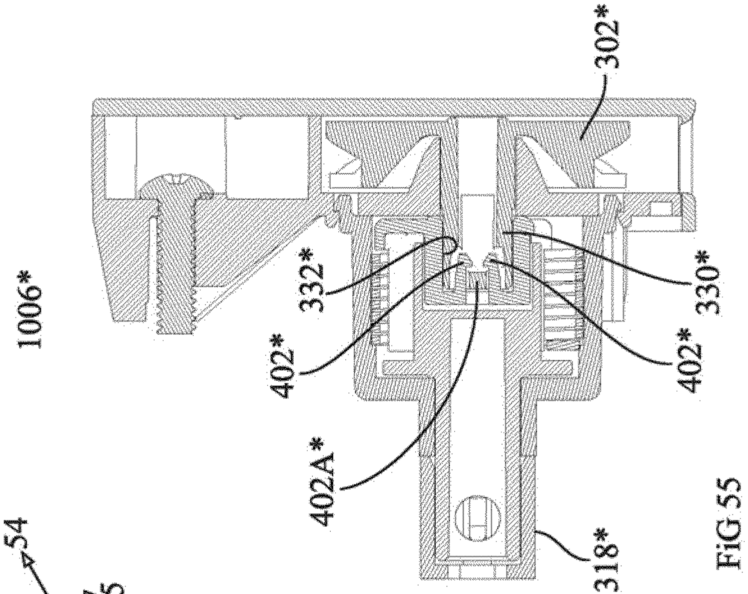
FIG. 55 is a section view along line 55-55 of FIG. 53.
Figure 56:
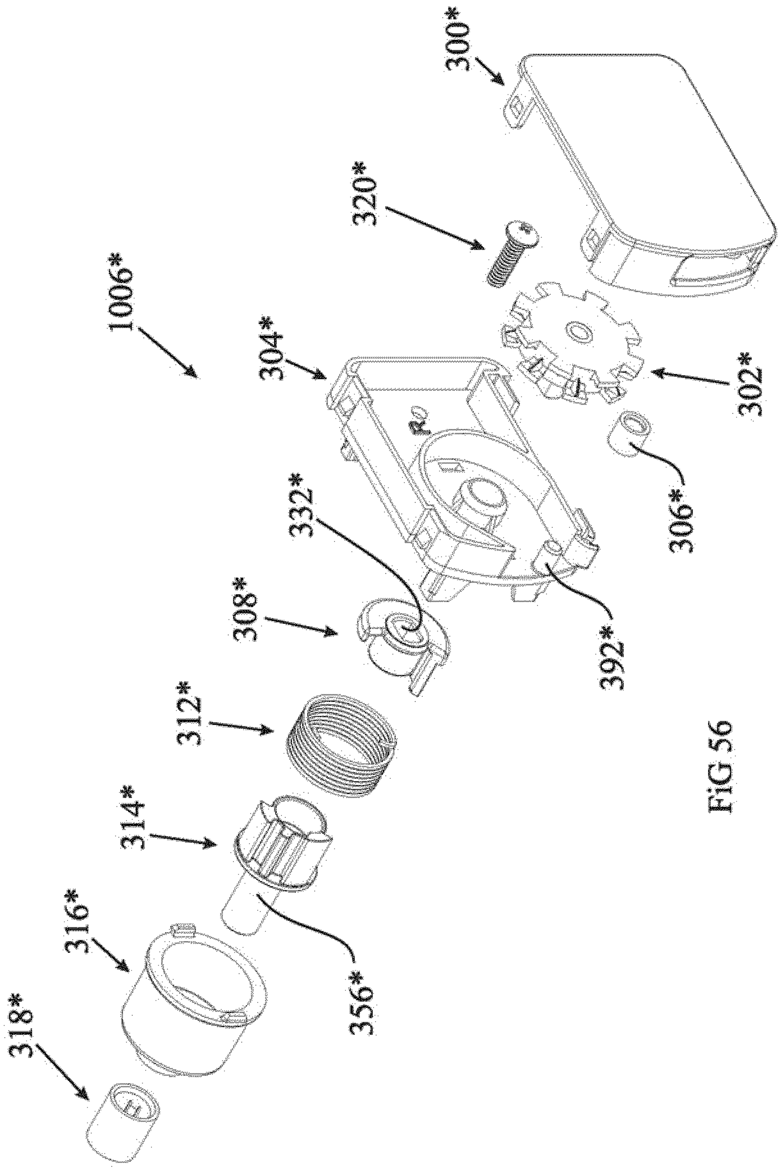
FIG. 56 is an exploded, perspective view of the cord drive of FIG. 53.
Figure 56A:
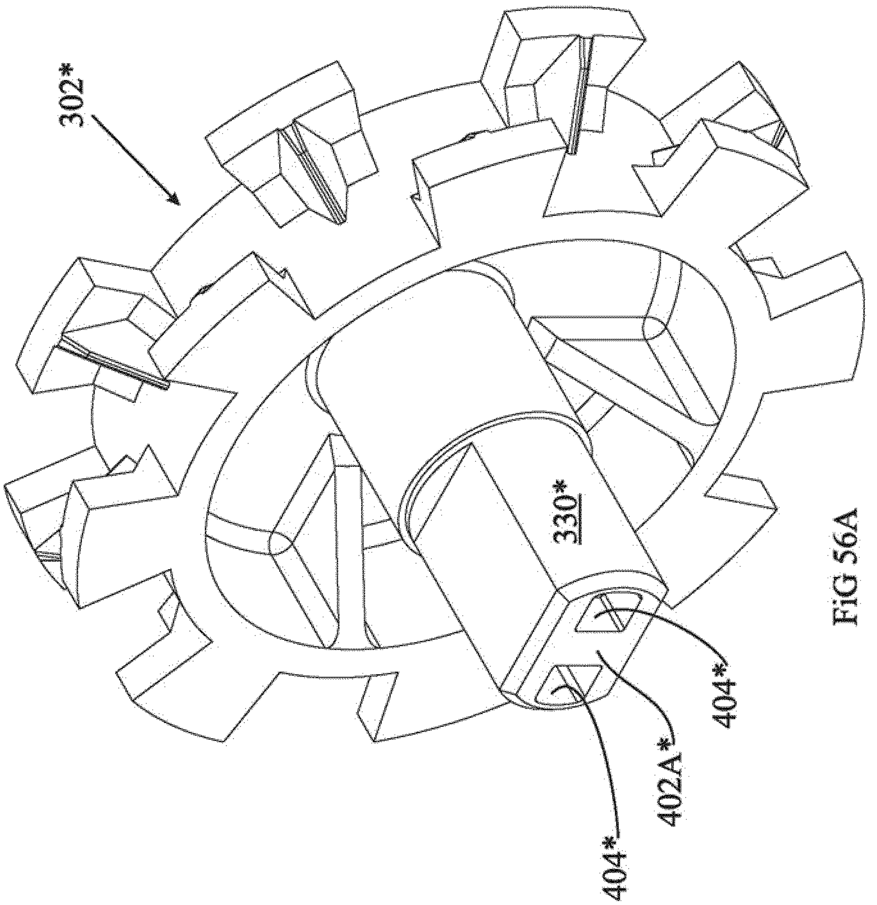
FIG. 56A is a perspective view of the sprocket of FIG. 56.

Referring to FIG. 56, the cord drive 1006* includes a housing cover 300*, a sprocket 302*, a housing 304*, a roller 306*, an input shaft 308*, a spring 312*, an output shaft 314*, a clutch housing 316*, and a collet 318* as with the previous embodiment. Referring also to FIG. 55, the cavity 332* of the input shaft 308*, which receives the distal shaft portion 330* of the sprocket 302*, defines two axially projecting fingers 402* which are designed to snap into two axially extending openings 404*(See FIG. 56A) on the distal shaft portion 330* of the sprocket 302* and releasably engage the inner end of the wall 402A* between those openings. This arrangement eliminates the need for the assembly screw 310 (See FIG. 40) of the previous embodiment 1006'.

Figure 50:
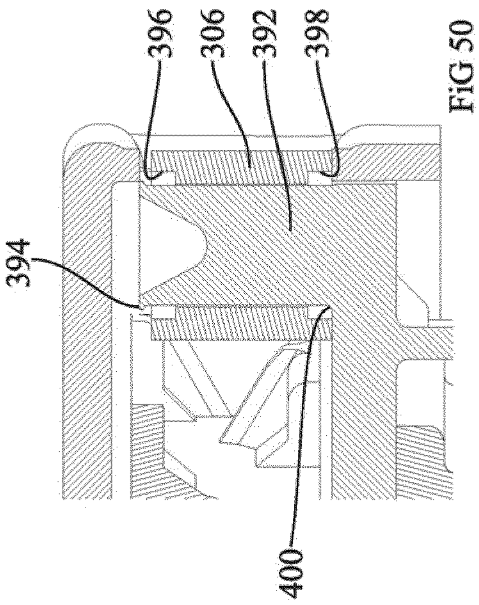
FIG. 50 is a section view along line 50-50 of FIG. 49.
Figure 49:
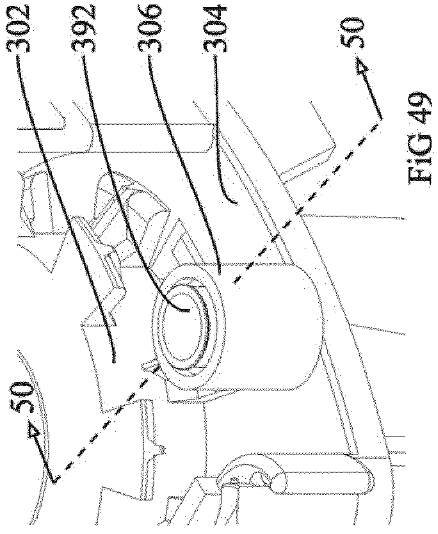
FIG. 49 is an enlarged view of the detail 49 of FIG. 37.
Figure 52:
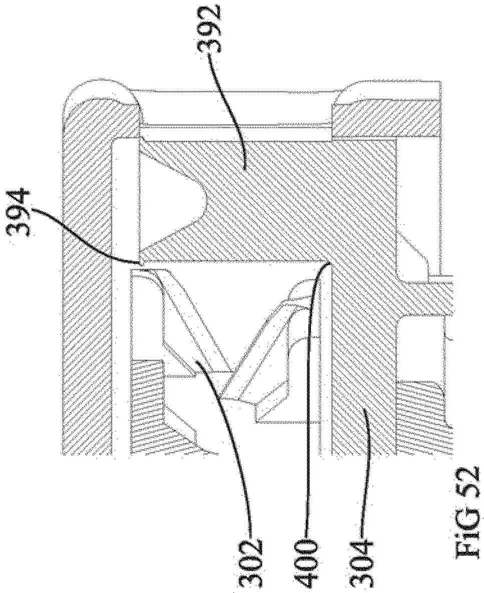
FIG. 52 is a section view along line 52-52 of FIG. 51.
Figure 51:
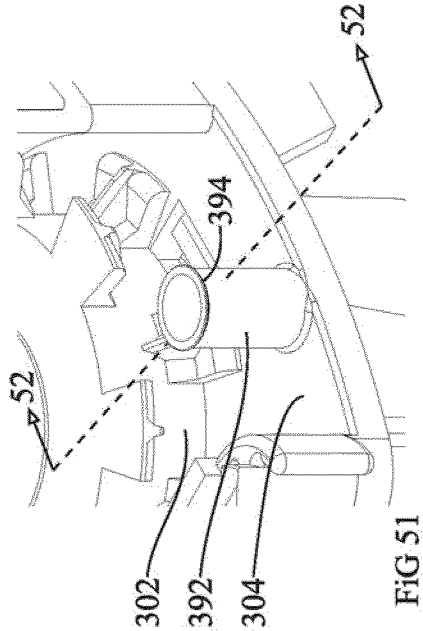
FIG. 51 is the same view as FIG. 49, but with the roller removed to more clearly show the peg on which the roller spins.
Figure 58:
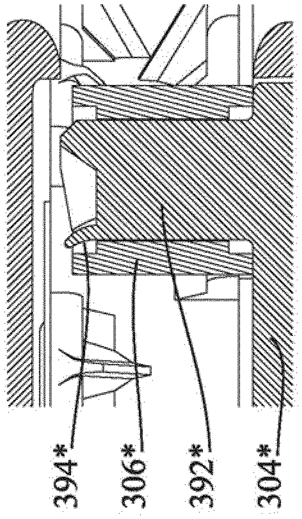
FIG. 58 is a section view, similar to that of FIG. 50, but for the embodiment of FIG. 56.
Figure 57:
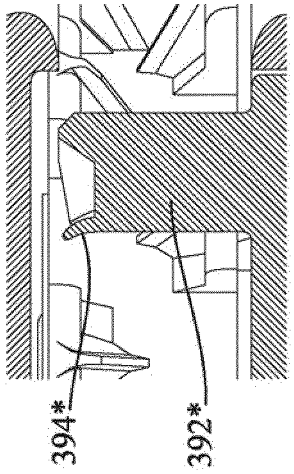
FIG. 57 is a section view, similar to that of FIG. 52, but for the embodiment of FIG. 56.

Referring now to FIGS. 57 and 58, and comparing these with FIGS. 52 and 50 respectively, it may be seen that the projection 392* for this alternate embodiment of the cord drive 1006* does not have a flange 394, but instead has a single finger 394* which projects radially from the distal end of the projection 392*. This finger 394* acts as a "live hinge" which flexes back toward the projection 392* to allow the roller 306* to slide past the finger 394* to be mounted onto the projection 392*, and then flexes back out to releasably retain the roller 306* on the projection 392*. The single finger 394* provides a much smaller potential contact area to hinder the rotation of the roller 306* on the projection 392* than the flange 394 of the earlier embodiment.

Figure 53:
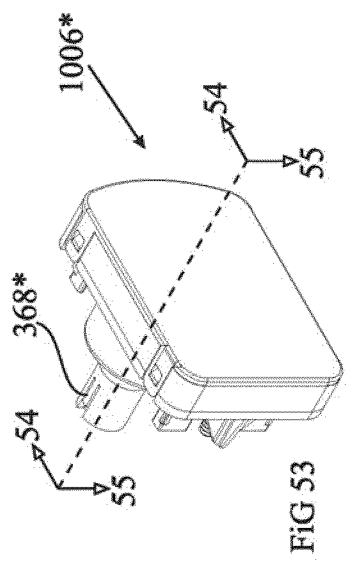
FIG. 53 is a perspective view of an alternate embodiment of the cord drive of FIG. 22.
Figure 54:
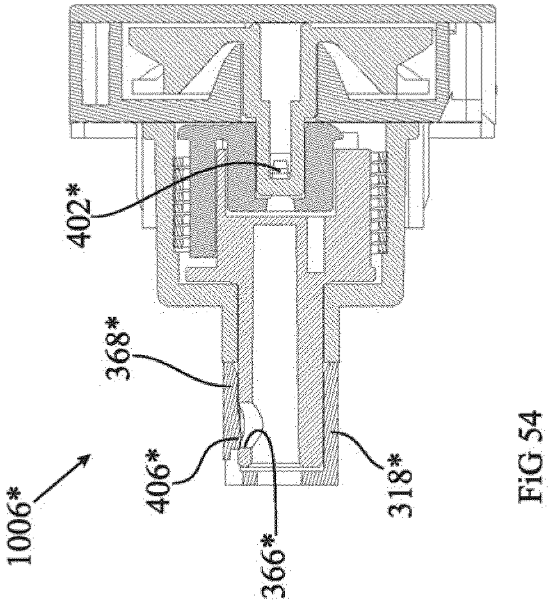
FIG. 54 is a section view along line 54-54 of FIG. 53.

Referring to FIGS. 53 and 54, the collet 318* is similar to the collet 318 of FIG. 40, except that, instead of using a screw 368 to project through the radial opening 366 (See FIG. 44) of the output shaft 314, the collet 318* defines a radially-extending finger 368* with a slight bump 406* at the distal end of the finger 368*. As the collet 318* is slid over the end of the hub 356* of the output shaft 314*, the bump 406* contacts the hub 356*, displacing the finger 368* outwardly until the bump 406* reaches the opening 366* on the output shaft 314*. The finger 368* then snaps back such that the bump 406* enters into the opening 366* to releasably secure the collet 318* to the output shaft 314*. The finger 368* acts as a "live hinge" to ensure that the bump 406* may flex outwardly for assembly or disassembly of the collet 318* from the output shaft 314*, but snaps back to push the bump 406* into the opening 366* to prevent unwanted disassembly of the components.

Figure 60:
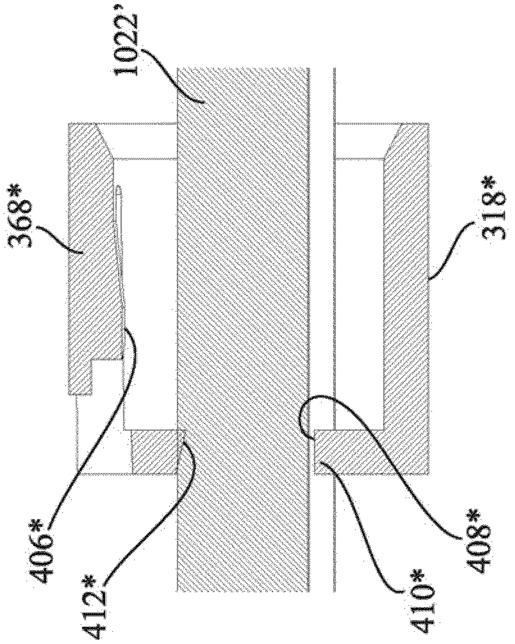
FIG. 60 is a section view along the line 60-60 of FIG. 59, but also showing a lift rod.
Figure 59:
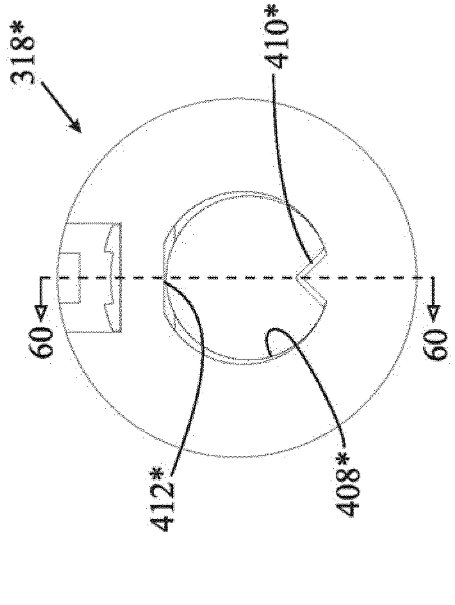
FIG. 59 is an end view of the collet of FIG. 56.

Referring now to FIGS. 59 and 60, the collet 318* defines a through opening 408* which receives the lift rod 1022'. This opening 408* includes a "V" projection 410* to match a similar V-shaped recess in the lift rod 1022' and, diametrically opposite from the "V" projection 410*, is a land or flat 412*. As best appreciated in FIG. 60, this land 412* pushes down on the lift rod 1022' to press the lift rod 1022' against the "V" projection 410* to ensure a secure engagement of the lift rod 1022' to the collet 318* and to the output shaft 316* to which it is connected.

This cord drive 1006* operates in the same manner as the cord drive 1006' described earlier.

It will be obvious to those skilled in the art that modifications may be made to the embodiments described above without departing from the scope of the present invention as defined by the claims.

What is claimed is:

1. A spring motor, comprising:

a housing;

an output spool mounted in said housing for rotation in clockwise and counterclockwise directions about a first axis of rotation, said output spool defining a first hollow core extending through the first axis of rotation;

a storage spool mounted in said housing for rotation in clockwise and counterclockwise directions about a second axis of rotation parallel to said first axis of rotation, said storage spool defining a second hollow core extending through the second axis of rotation; and a motor spring wound upon itself and upon the storage spool and having a first end and a second end, said motor spring being secured to said output spool at said first end;

wherein said housing defines openings aligned with said first and second hollow cores, and further comprising first and second shafts extending completely through said housing and through said first and second hollow cores, respectively, wherein at least one of said first and second shafts is driven by said output spool, and the other of said first and second shafts rotates independently of said output spool.

2. A spring motor as recited in claim 1, and further comprising a covering for an architectural opening; and a first set of lift cords operatively connected to said covering for extending and retracting said covering; wherein one of said first and second shafts drives said first set of lift cords.

3. A spring motor as recited in claim 2, and further comprising a second set of lift cords operatively connected to said covering for extending and retracting said covering; wherein the other of said first and second shafts drives the second set of lift cords.

4. A spring motor as recited in claim 2, and further comprising a set of tilt cords operatively connected to said covering for tilting said covering; wherein the other of said first and second shafts drives said set of tilt cords.

5. A spring motor, comprising:

a housing;

an output spool mounted in said housing for rotation in clockwise and counterclockwise directions about a first axis of rotation, said output spool defining a first hollow core extending through the first axis of rotation;

a storage spool mounted in said housing for rotation in clockwise and counterclockwise directions about a second axis of rotation parallel to said first axis of rotation, said storage spool defining a second hollow core extending through the second axis of rotation; and a motor spring wound upon itself and upon the storage spool and having a first end and a second end, said motor spring being secured to said output spool at said first end;

wherein said housing defines openings aligned with said first and second hollow cores, and further comprising first and second shafts extending completely through said housing and through said first and second hollow cores, respectively, wherein at least one of said first and second shafts is driven by said output spool, and further comprising a covering for an architectural opening; and a first set of lift cords operatively connected to said covering for extending and retracting said covering; wherein one of said first and second shafts drives said first set of lift cords; and a set of tilt cords operatively connected to said covering for tilting said covering; a set of gears interconnecting said first and second shafts, wherein said one shaft drives said other shaft through said gears, and said other shaft drives said tilt cables;

wherein each of the gears defines a circumference with gear teeth arranged around the circumference, and wherein at least a portion of the circumference of one of said gears has no gear teeth and defines a gap such that said one shaft drives said other shaft to tilt the covering only until the gap is reached, at which point the one shaft continues to rotate without driving the other shaft.

6. A spring motor, comprising:

a housing;

an output spool mounted in said housing for rotation in clockwise and counterclockwise directions about a first axis of rotation, said output spool defining a first hollow core extending through the first axis of rotation;

a storage spool mounted in said housing along a longitudinal axis parallel to said first axis of rotation, said storage spool defining a second hollow core extending through said longitudinal axis; wherein at least one of said first and second hollow cores defines a non-cylindrical profile;

a motor spring wound upon itself and upon the storage spool and having a first end and a second end, said motor spring being secured to said output spool at said first end;

a first shaft extending through said housing and through said output spool;

a second shaft extending through said housing and through said storage spool; and further comprising a covering for an architectural opening including first and second movable rails operatively connected to said covering for extending and retracting said covering;

a first set of lift cords operatively connected to said first movable rail; and a second set of lift cords operatively connected to said second movable rail; wherein one of said first and second shafts drives said first set of lift cords and the other of said first and second shafts drives said second set of lift cords.

7. A spring motor comprising:

a housing;

an output spool mounted in said housing for rotation in clockwise and counterclockwise directions about a first axis of rotation, said output spool defining a first hollow core extending through the first axis of rotation;

a storage spool mounted in said housing along a longitudinal axis parallel to said first axis of rotation, said storage spool defining a second hollow core extending through said longitudinal axis; wherein at least one of said first and second hollow cores defines a non-cylindrical profile;

a motor spring wound upon itself and upon the storage spool and having a first end and a second end, said motor spring being secured to said output spool at said first end;

a first shaft extending through said housing and through said output spool;

a second shaft extending through said housing and through said storage spool; and further comprising a covering for an architectural opening including a first set of lift cords operatively connected to said covering for extending and retracting the covering; wherein one of said first and second shafts drives said first set of lift cords;

a set of tilt cables operatively connected to said covering for tilting said covering; wherein said other shaft drives said set of tilt cables; and wherein one of said first and second shafts is driven by said output spool and the other of said first and second shafts rotates independently of said output spool.

8. A spring motor, comprising:

a housing;

an output spool mounted in said housing for rotation in clockwise and counterclockwise directions about a first axis of rotation, said output spool defining a first hollow core extending through the first axis of rotation;

a storage spool mounted in said housing along a longitudinal axis parallel to said first axis of rotation, said storage spool defining a second hollow core extending through said longitudinal axis; wherein at least one of said first and second hollow cores defines a non-cylindrical profile;

a motor spring wound upon itself and upon the storage spool and having a first end and a second end, said motor spring being secured to said output spool at said first end;

a first shaft extending through said housing and through said output spool;

a second shaft extending through said housing and through said storage spool; and further comprising a covering for an architectural opening including a first set of lift cords operatively connected to said covering for extending and retracting the covering; wherein one of said first and second shafts drives said first set of lift cords;

a set of tilt cables operatively connected to said covering for tilting said covering;

a set of gears interconnecting said first and second shafts, wherein said one shaft drives said other shaft through said gears, and said other shaft drives said tilt cables;

wherein each of the gears defines a circumference with gear teeth arranged around the circumference, and wherein at least a portion of the circumference of one of said gears has no gear teeth and defines a gap such that said one shaft drives said other shaft to tilt the covering only until the gap is reached, at which point the one shaft continues to rotate without driving the other shaft.

9. A spring motor as recited in claim 6, wherein said output spool drives said second shaft; and wherein said second shaft is operatively connected to said first set of lift cords.

10. A spring motor as recited in claim 9, and further comprising a first gear coaxial with and mounted for rotation with said output spool; and a second gear coaxial with said storage spool; wherein said first gear drives said second gear; and said second gear drives said second shaft.

11. A spring motor as recited in claim 1, wherein said output spool drives said second shaft.

12. A spring motor as recited in claim 11, and further comprising a first gear coaxial with and mounted for rotation with said output spool; and a second gear coaxial with said storage spool; wherein said first gear drives said second gear; and said second gear drives said second shaft.

13. A spring motor as recited in claim 12, wherein the first shaft rotates independently of said output spool.

14. A spring motor as recited in claim 11, and further comprising a covering for an architectural opening including a first set of lift cords operatively connected to said covering for extending and retracting said covering, wherein said second shaft is operatively connected to said first set of lift cords.

15. A spring motor as recited in claim 11, wherein the first shaft rotates independently of said output spool.

16. A spring motor as recited in claim 15, and further comprising a covering for an architectural opening including a first set of lift cords operatively connected to said covering for extending and retracting said covering, wherein said second shaft is operatively connected to said first set of lift cords.

17. A spring motor as recited in claim 3, and further comprising first and second movable rails connected to said covering, wherein said first set of lift cords drives one of said first and second movable rails and said second set of lift cords drives the other of said first and second movable rails.

* * * * *